(12) United States Patent
Safai

(10) Patent No.: US 12,553,839 B2
(45) Date of Patent: *Feb. 17, 2026

(54) SYSTEM, METHOD, AND APPARATUS FOR X-RAY BACKSCATTER INSPECTION OF PARTS

(71) Applicant: The Boeing Company, Arlington, VA (US)

(72) Inventor: Morteza Safai, Newcastle, WA (US)

(73) Assignee: The Boeing Company, Arlington, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/945,243

(22) Filed: Nov. 12, 2024

(65) Prior Publication Data

US 2025/0067689 A1  Feb. 27, 2025

Related U.S. Application Data

(63) Continuation of application No. 17/695,495, filed on Mar. 15, 2022, now Pat. No. 12,163,903.

(60) Provisional application No. 63/187,616, filed on May 12, 2021.

(51) Int. Cl.
G01N 23/20008 (2018.01)
G01N 23/203 (2006.01)
H01J 35/14 (2006.01)

(52) U.S. Cl.
CPC ..... *G01N 23/203* (2013.01); *G01N 23/20008* (2013.01); *H01J 35/153* (2019.05); *G01N 2223/053* (2013.01); *G01N 2223/1016* (2013.01); *G01N 2223/204* (2013.01); *G01N 2223/316* (2013.01); *G01N 2223/3301* (2013.01); *G01N 2223/5015* (2013.01); *G01N 2223/503* (2013.01); *G01N 2223/645* (2013.01); *G01N 2223/646* (2013.01)

(58) Field of Classification Search
None
See application file for complete search history.

(56) References Cited

U.S. PATENT DOCUMENTS

| | | |
|---|---|---|
| 4,002,911 A | 1/1977 | Hounsfield |
| 4,277,684 A | 7/1981 | Carson |
| 4,698,835 A | 10/1987 | Ono et al. |

(Continued)

FOREIGN PATENT DOCUMENTS

WO  2019214674  11/2019

*Primary Examiner* — Thomas R Artman
(74) *Attorney, Agent, or Firm* — Kunzler Bean & Adamson

(57) ABSTRACT

Disclosed herein is an x-ray backscatter apparatus for non-destructive inspection of a part. The x-ray backscatter apparatus includes an x-ray source and an x-ray collimator. The x-ray collimator includes a plurality of emission apertures and a detection aperture. The x-ray backscatter apparatus further includes an x-ray intensity sensor that is fixed to the x-ray collimator over the detection aperture such that at least a portion of an uncollimated x-ray emission, collimated into the detection aperture, is detected by the x-ray intensity sensor. The x-ray backscatter apparatus additionally includes an emission alignment adjuster that is operable to adjust a position of the uncollimated x-ray emission relative to the plurality of emission apertures and the detection aperture in response to the at least the portion of the uncollimated x-ray emission detected by the x-ray intensity sensor.

20 Claims, 14 Drawing Sheets

(56) References Cited

U.S. PATENT DOCUMENTS

| | | |
|---|---|---|
| 4,730,353 A | 3/1988 | Ono et al. |
| 4,803,711 A | 2/1989 | Tsujii et al. |
| 4,870,671 A | 9/1989 | Hershyn |
| 5,469,429 A | 11/1995 | Yamazaki et al. |
| 5,550,886 A | 8/1996 | Dobbs et al. |
| 5,625,661 A | 4/1997 | Oikawa |
| 5,867,553 A | 2/1999 | Gordon et al. |
| 6,094,469 A | 7/2000 | Dobbs et al. |
| 6,477,231 B2 | 11/2002 | Snyder et al. |
| 7,529,343 B2 | 5/2009 | Safai |
| 7,568,836 B2 | 8/2009 | Bailey et al. |
| 7,609,807 B2 | 10/2009 | Leue et al. |
| 8,761,338 B2 | 6/2014 | Safai |
| 8,855,268 B1 | 10/2014 | Safai et al. |
| 9,014,339 B2 | 4/2015 | Grodzins et al. |
| 9,020,103 B2 | 4/2015 | Grodzins |
| 9,052,271 B2 | 6/2015 | Grodzins et al. |
| 9,151,721 B2 | 10/2015 | Safai |
| 9,291,582 B2 | 3/2016 | Grodzins et al. |
| 9,355,810 B2 | 5/2016 | Chen et al. |
| 9,417,194 B2 | 8/2016 | Wiedmann |
| 9,779,908 B2 | 10/2017 | Ding et al. |
| 10,535,491 B2 | 1/2020 | Rommel et al. |
| 10,541,061 B2 | 1/2020 | Wang |
| 10,762,998 B2 | 9/2020 | Rothschild |
| 10,908,100 B2 | 2/2021 | Safai |
| 11,169,098 B2 | 11/2021 | Safai |
| 11,257,653 B2 | 2/2022 | Safai |
| 11,393,654 B2 | 7/2022 | Bartzsch et al. |
| 11,854,712 B2 | 12/2023 | Zambelli et al. |
| 12,163,903 B2 * | 12/2024 | Safai .................. G01N 23/203 |
| 2002/0085675 A1 | 7/2002 | Snyder et al. |
| 2005/0180542 A1 | 8/2005 | Leue et al. |
| 2007/0172031 A1 | 7/2007 | Carson et al. |
| 2007/0195938 A1 | 8/2007 | Bailey et al. |
| 2007/0269014 A1 | 11/2007 | Safai et al. |
| 2012/0106714 A1 | 5/2012 | Grodzins et al. |
| 2012/0269319 A1 | 10/2012 | Grodzins et al. |
| 2012/0321046 A1 | 12/2012 | Safai |
| 2013/0003936 A1 | 1/2013 | Grodzins et al. |
| 2013/0195248 A1 | 8/2013 | Rothschild et al. |
| 2014/0056412 A1 | 2/2014 | Chen et al. |
| 2014/0064453 A1 | 3/2014 | Safai |
| 2014/0233707 A1 | 8/2014 | Grodzins et al. |
| 2015/0049857 A1 | 2/2015 | Wiedmann |
| 2015/0173692 A1 | 6/2015 | Heuscher |
| 2015/0371809 A1 | 12/2015 | Ding et al. |
| 2017/0358380 A1 | 12/2017 | Rothschild |
| 2018/0012724 A1 | 1/2018 | Rommel et al. |
| 2018/0158562 A1 | 6/2018 | Wang |
| 2019/0164717 A1 | 5/2019 | Bartzsch et al. |
| 2020/0096457 A1 | 3/2020 | Safai |
| 2021/0305005 A1 | 9/2021 | Safai |
| 2021/0310967 A1 | 10/2021 | Safai |
| 2022/0130568 A1 | 4/2022 | Zambelli et al. |
| 2022/0365006 A1 | 11/2022 | Safai |

* cited by examiner

SYSTEM, METHOD, AND APPARATUS FOR X-RAY BACKSCATTER INSPECTION OF PARTS

FIELD

This disclosure relates generally to the non-destructive inspection of parts, and more particularly to inspection of parts using x-ray backscatter apparatuses, systems, and methods.

BACKGROUND

Some inspection techniques, such as non-destructive testing, foreign object detection, non-line-of-site examination, etc., are employed when destruction of a part to be inspected is not desirable. Certain x-ray inspection techniques provide a penetrating scan or examination of a part. Such x-ray inspection techniques are used in a variety of applications, such as homeland security, oil and gas mining and refining, pipeline inspection, transportation, automotive, aerospace, marine, mining, shipping, and storage, among others.

Some inspection techniques utilize the detection of x-rays that pass through a part from one side of the part to the opposite side of the part. However, in other inspection techniques, such as x-ray backscattering techniques, the x-rays reflected back from the part (e.g., backscattered x-rays) are detected and then used to produce images or an analysis of the part. The pattern and intensity of the backscattered x-rays depends upon the materials and organization of the part. Accordingly, the pattern and intensity of the backscattered x-rays can be used to generate an image, which is relied upon to determine a quality, characteristic, or flaw of the part.

The configuration of conventional x-ray backscatter systems wastes up to 90% of the energy input into the systems. This is mainly due to the remoteness of the x-ray collimating device or wheel relative to the x-ray emission source and the circular shape of the x-ray emission generated by the x-ray emission source. Reducing wasted energy while still providing high quality and accurate inspection of parts is desirable.

SUMMARY

The subject matter of the present application has been developed in response to the present state of the art, and in particular, in response to the shortcomings of conventional x-ray backscatter techniques and systems, that have not yet been fully solved by currently available techniques. Accordingly, the subject matter of the present application has been developed to provide an x-ray backscatter apparatus, system, and method that overcome at least some of the above-discussed shortcomings of prior art techniques.

The following is a non-exhaustive list of examples, which may or may not be claimed, of the subject matter, disclosed herein.

Disclosed herein is an x-ray backscatter apparatus for non-destructive inspection of a part. The x-ray backscatter apparatus comprises an x-ray source and an x-ray collimator. The x-ray source comprises a cathode that is selectively operable to generate an electron emission and an anode that is configured to receive the electron emission from the cathode and to convert the electron emission into an uncollimated x-ray emission. The x-ray collimator comprises a plurality of emission apertures and a detection aperture. The x-ray backscatter apparatus further comprises an x-ray intensity sensor that is fixed to the x-ray collimator over the detection aperture such that any portion of the uncollimated x-ray emission collimated into the detection aperture is detected by the x-ray intensity sensor. The x-ray backscatter apparatus additionally comprises an emission alignment adjuster that is operable to adjust a position of the uncollimated x-ray emission relative to the plurality of emission apertures and the detection aperture in response to a position, relative to the detection aperture, of a peak intensity of the uncollimated x-ray emission passing into the detection aperture, detected by the x-ray intensity sensor. The preceding subject matter of this paragraph characterizes example 1 of the present disclosure.

The x-ray intensity sensor comprises a plurality of pixels, each configured to detect an intensity of the uncollimated x-ray emission independent of any other one of the plurality of pixels. The plurality of pixels are arranged linearly in a side-by-side manner. The preceding subject matter of this paragraph characterizes example 2 of the present disclosure, wherein example 2 also includes the subject matter according to example 1, above.

The x-ray collimator comprises a collimator ring. The plurality of emission apertures and the detection aperture are formed in the collimator ring. The collimator ring is rotatable about the anode such that the plurality of emission apertures and the detection aperture move relative to the uncollimated x-ray emission in a rotational direction. The plurality of pixels of the x-ray intensity sensor are arranged linearly in a linear direction that is perpendicular to the rotational direction. The preceding subject matter of this paragraph characterizes example 3 of the present disclosure, wherein example 3 also includes the subject matter according to example 2, above.

The plurality of pixels comprises a central pixel and a plurality of side pixels on opposite sides of the central pixel. A plane, parallel with the rotational direction and bisecting the plurality of emission apertures and the detection aperture, bisects the central pixel. The preceding subject matter of this paragraph characterizes example 4 of the present disclosure, wherein example 4 also includes the subject matter according to example 3, above.

The emission alignment adjuster adjusts the position of the uncollimated x-ray emission relative to the plurality of emission apertures and the detection aperture when the central pixel of the x-ray intensity sensor does not detect the peak intensity of the uncollimated x-ray emission collimated into the detection aperture. The preceding subject matter of this paragraph characterizes example 5 of the present disclosure, wherein example 5 also includes the subject matter according to example 4, above.

The x-ray intensity sensor is fixed to the collimator ring such that the x-ray intensity sensor rotates about the anode as the collimator ring rotates about the anode. The preceding subject matter of this paragraph characterizes example 6 of the present disclosure, wherein example 6 also includes the subject matter according to any one of examples 3-5, above.

Each one of the plurality of emission apertures is spaced apart, along a circumference of the collimator ring, from an adjacent one of the plurality of emission apertures by a first distance. The detection aperture is interposed between an adjacent two emission apertures of the plurality of emission apertures such that the detection aperture is spaced apart, along the circumference of the collimator ring, from either one of the adjacent two emission apertures of the plurality of emission apertures by a second distance. The second distance is less than the first distance. The preceding subject matter of this paragraph characterizes example 7 of the present disclosure, wherein example 7 also includes the subject matter according to any one of examples 3-6, above.

The emission alignment adjuster comprises an alignment-adjustment coil, between the cathode and the anode and fixed relative to the cathode and the anode such that the alignment-adjustment coil does not move relative to the cathode and the anode. The preceding subject matter of this paragraph characterizes example 8 of the present disclosure, wherein example 8 also includes the subject matter according to any one of examples 1-7, above.

The alignment-adjustment coil is configured to generate an adjustable electromagnetic field that is adjustable to move the electron emission, linearly along the anode in an anode direction such that the uncollimated x-ray emission moves linearly along the x-ray collimator in a linear direction. The preceding subject matter of this paragraph characterizes example 9 of the present disclosure, wherein example 9 also includes the subject matter according to example 8, above.

The emission alignment adjuster comprises a linear actuator, coupled to the x-ray collimator and operable to translationally move the x-ray collimator, including the plurality of emission apertures and the detection aperture, relative to the anode. The preceding subject matter of this paragraph characterizes example 10 of the present disclosure, wherein example 10 also includes the subject matter according to any one of examples 1-7, above.

The x-ray collimator comprises a collimator ring. The plurality of emission apertures and the detection aperture are formed in the collimator ring. The collimator ring is rotatable about the anode such that the plurality of emission apertures and the detection aperture move relative to the uncollimated x-ray emission in a rotational direction. The linear actuator moves the collimator ring in a linear direction that is perpendicular to the rotational direction. The preceding subject matter of this paragraph characterizes example 11 of the present disclosure, wherein example 11 also includes the subject matter according to example 10, above.

The emission alignment adjuster comprises an alignment-adjustment coil, between the cathode and the anode and fixed relative to the cathode and the anode such that the alignment-adjustment coil does not move relative to the cathode and the anode and a linear actuator, coupled to the x-ray collimator and operable to translationally move the x-ray collimator, including the plurality of emission apertures and the detection aperture, relative to the anode. The alignment-adjustment coil is configured to adjust the position of the uncollimated x-ray emission, relative to the plurality of emission apertures and the detection aperture, up to a first predetermined distance. The linear actuator is configured to adjust the position of the uncollimated x-ray emission, relative to the plurality of emission apertures and the detection aperture, up to a second predetermined distance. The second predetermined distance is greater than the first predetermined distance. The preceding subject matter of this paragraph characterizes example 12 of the present disclosure, wherein example 12 also includes the subject matter according to any one of examples 1-11, above.

The x-ray intensity sensor is a radiation hardened sensor such that the x-ray intensity sensor prevents the uncollimated x-ray emission from exiting the detection aperture of the x-ray collimator. The preceding subject matter of this paragraph characterizes example 13 of the present disclosure, wherein example 13 also includes the subject matter according to any one of examples 1-12, above.

The x-ray source further comprises a first pair of deflection plates between the cathode and the emission alignment adjuster, a second pair of deflection plates between the first pair of deflection plates and the alignment adjuster, a first alignment coil between the cathode and the first pair of deflection plates, and a second alignment coil between the second pair of deflection plates and the emission alignment adjuster. The preceding subject matter of this paragraph characterizes example 14 of the present disclosure, wherein example 14 also includes the subject matter according to any one of examples 1-13, above.

Further disclosed herein is an x-ray backscatter system for non-destructive inspection of a part. The x-ray backscatter system comprises an x-ray backscatter apparatus. The x-ray backscatter apparatus comprises an x-ray source that comprises a cathode that is selectively operable to generate an electron emission and an anode, configured to receive the electron emission from the cathode and to convert the electron emission into an uncollimated x-ray emission. The x-ray backscatter apparatus also comprises an x-ray collimator that comprises a plurality of emission apertures and a detection aperture and configured to convert the uncollimated x-ray emission into a collimated x-ray emission, comprising a portion of the uncollimated x-ray emission collimated through the plurality of emission apertures. The x-ray backscatter apparatus further comprises an x-ray intensity sensor that is fixed to the x-ray collimator over the detection aperture such that any portion of the uncollimated x-ray emission collimated into the detection aperture is detected by the x-ray intensity sensor. The x-ray backscatter apparatus additionally comprises an emission alignment adjuster that is operable to adjust a position of the uncollimated x-ray emission relative to the plurality of emission apertures and the detection aperture. The x-ray backscatter apparatus also comprises a plurality of x-ray detectors that is positioned to detect backscattered portions of the collimated x-ray emission, backscattered off of the part. The x-ray backscatter system also comprises a controller that is operably coupled with the x-ray intensity sensor and the emission alignment adjuster and configured to control the emission alignment adjuster, such that a position of the uncollimated x-ray emission, relative to the plurality of emission apertures and the detection aperture, is adjusted in response to a position of the peak intensity of the uncollimated x-ray emission, relative to the detection aperture, detected by and received from the x-ray intensity sensor. The preceding subject matter of this paragraph characterizes example 15 of the present disclosure.

Additionally disclosed herein is a method of non-destructive inspection of a part. The method comprises steps of generating an electron emission, converting the electron emission into an uncollimated x-ray emission, and collimating only a portion of the uncollimated x-ray emission into a detection aperture of an x-ray collimator. The method additionally includes detecting a position of a peak intensity of the uncollimated x-ray emission, collimated into the detection aperture, relative to the detection aperture, and adjusting a position of the uncollimated x-ray emission relative to an emission aperture of the x-ray collimator in response to a detected position of the peak intensity of the uncollimated x-ray emission, collimated into the detection aperture, relative to the detection aperture. The preceding subject matter of this paragraph characterizes example 16 of the present disclosure.

The method further comprises a step of determining whether the detected position of the peak intensity of the uncollimated x-ray emission, collimated into the detection aperture, is centered relative to the detection aperture. The step of adjusting the position of the uncollimated x-ray emission relative to the emission aperture of the x-ray collimator comprises adjusting the position of the uncollimated x-ray emission relative to the emission aperture when the detected position of the peak intensity of the uncollimated x-ray emission, collimated into the detection aperture, is not centered relative to the detection aperture. The preceding subject matter of this paragraph characterizes example 17 of the present disclosure, wherein example 17 also includes the subject matter according to example 16, above.

The step of adjusting the position of the uncollimated x-ray emission relative to the emission aperture of the x-ray collimator comprises adjusting the position of the uncollimated x-ray emission relative to the emission aperture until the detected position of the peak intensity of the uncollimated x-ray emission, collimated into the detection aperture, is centered relative to the detection aperture. The preceding subject matter of this paragraph characterizes example 18 of the present disclosure, wherein example 18 also includes the subject matter according to example 17, above.

The method further comprises moving the emission aperture in a first direction, relative to the uncollimated x-ray emission, such that only a portion of the uncollimated x-ray emission passes through the emission aperture. The step of adjusting the position of the uncollimated x-ray emission relative to the emission aperture of the x-ray collimator comprises moving the emission aperture in a second direction that is perpendicular to the first direction. The preceding subject matter of this paragraph characterizes example 19 of the present disclosure, wherein example 19 also includes the subject matter according to any one of examples 16-18, above.

The step of converting the electron emission into the uncollimated x-ray emission comprises impacting an anode with the electron emission. The step of adjusting the position of the uncollimated x-ray emission relative to the emission aperture of the x-ray collimator comprises at least one of moving the x-ray collimator relative to the anode in the second direction or moving the electron emission relative to the anode. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Described herein is an x-ray backscatter system, and associated apparatus and method, for non-destructively inspecting parts. The x-ray backscatter system is configured to facilitate non-destructive inspection of parts with less wasted energy, with lower complexity, at a lower cost, and with higher portability than conventional x-ray backscatter systems. The configuration of conventional x-ray backscatter systems wastes up to 90% of the energy input into the systems. This is mainly due to the remoteness of the x-ray collimating device or wheel relative to the x-ray emission source, the circular shape of the x-ray emission generated by the x-ray emission source, and the potential misalignment between the peak intensity of the x-ray emission and collimating apertures, which can result in a drop in x-ray beam flux through the collimating apertures. The x-ray backscatter system of the present disclosure helps to reduce wasted energy, reduce complexity, save costs, and promote portability by locating the x-ray collimator device at the vacuum tube of the x-ray emitter (which facilitates a smaller size of the x-ray backscatter system), shaping the x-ray emission into a more efficient elliptical shape, and adjusting a position of the x-ray emission relative to collimating apertures to promote alignment of the peak intensity of the x-ray emission with the collimating apertures.

Figure 1:
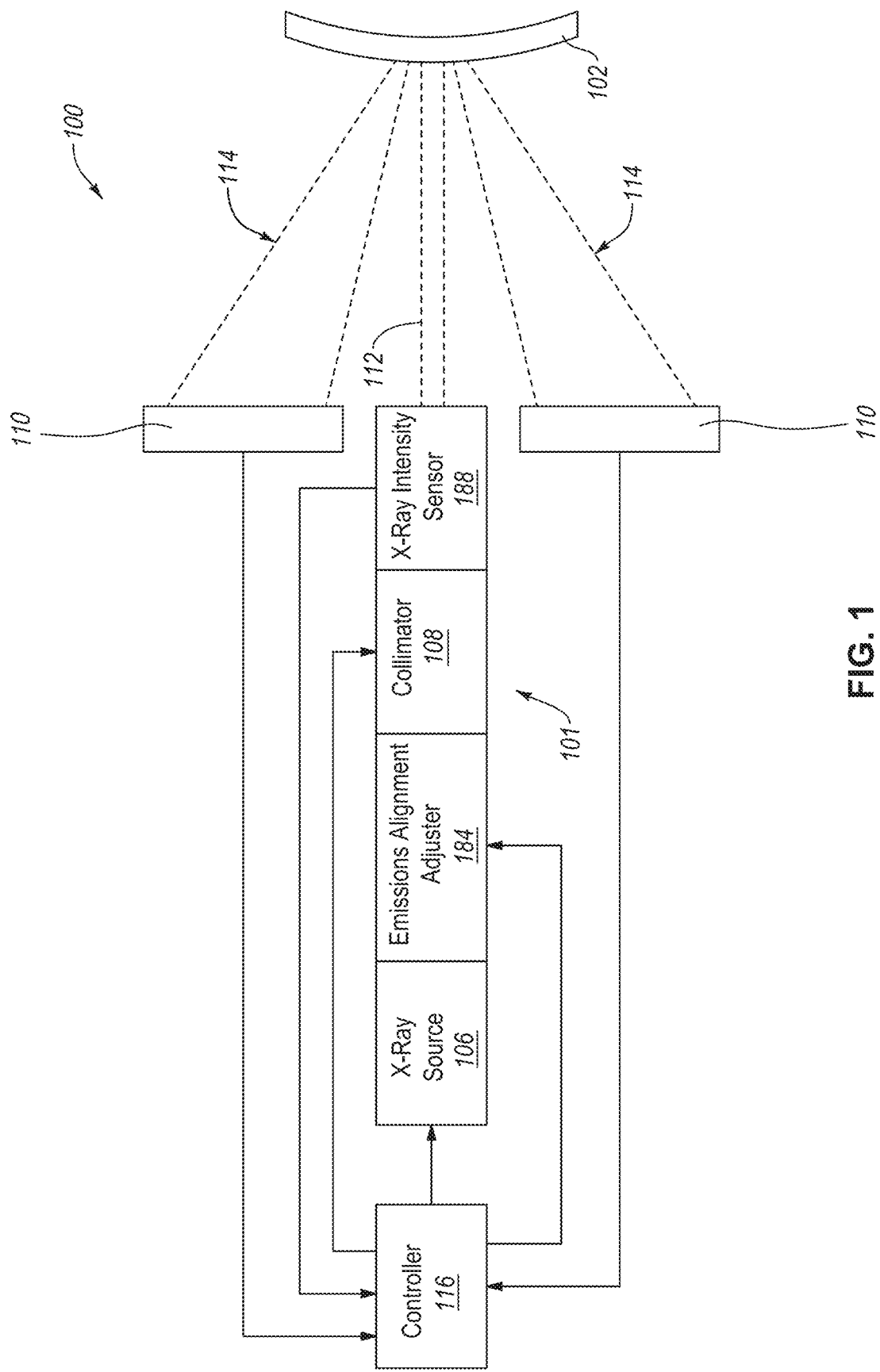
FIG. 1 is a schematic block diagram of a system for x-ray backscatter inspection of a part, according to one or more examples of the present disclosure.

Referring to FIG. 1, according to some examples, an x-ray backscatter system 100 is shown non-destructively inspecting a part 102. The part 102 can be any of various parts made of any of various materials. In one example, the part 102 is a part of an aircraft and the part 102 is made of a fiber-reinforced polymer. The x-ray backscatter system 100 includes an x-ray backscatter apparatus 101 and a controller 116. The x-ray backscatter apparatus 101 includes an x-ray emitter 104 and a plurality of x-ray detectors 110. The x-ray emitter 104 is configured to generate a collimated x-ray emission 112. The collimated x-ray emission 112 is directed at the part 102. Portions of the collimated x-ray emission 112 backscatter off of the surface of the part 102, partially penetrate the part 102 and backscatter off of internal features of the part 102, and pass entirely though the part 102. The backscattered portions 114 of the collimated x-ray emission 112 are detected by the x-ray detectors 110. The characteristics (e.g., wavelength, intensity, etc.) of the backscattered portions 114 detected by the x-ray detectors 110 are determined and analyzed by the controller 116 to determine the presence of abnormalities or other features in the part 102 being inspected. The controller 116 also controls the generation and characteristics of the collimated x-ray emission 112 by controlling operation of the x-ray emitter 104.

Figure 2:
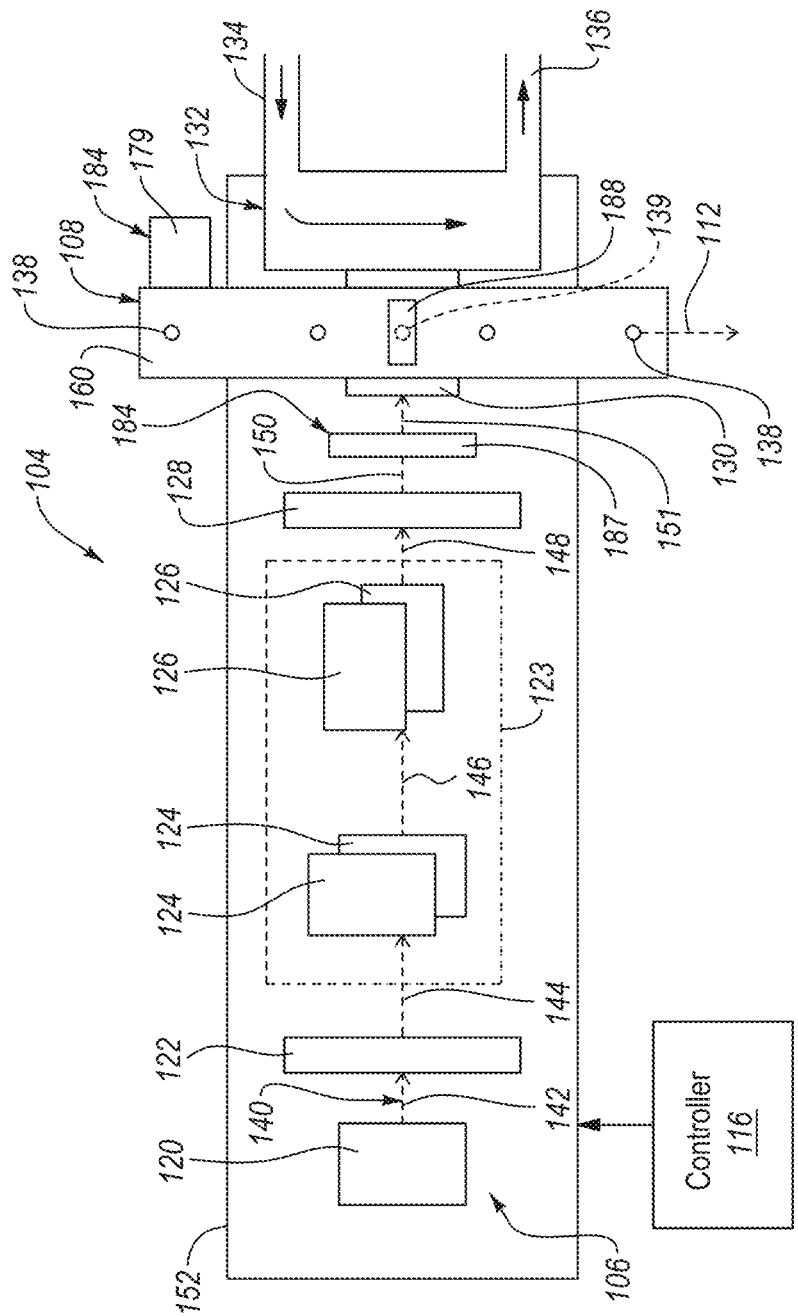
FIG. 2 is a schematic block diagram of an x-ray emitter of an x-ray backscatter apparatus of the system of FIG. 1, according to one or more examples of the present disclosure.
Figure 3:
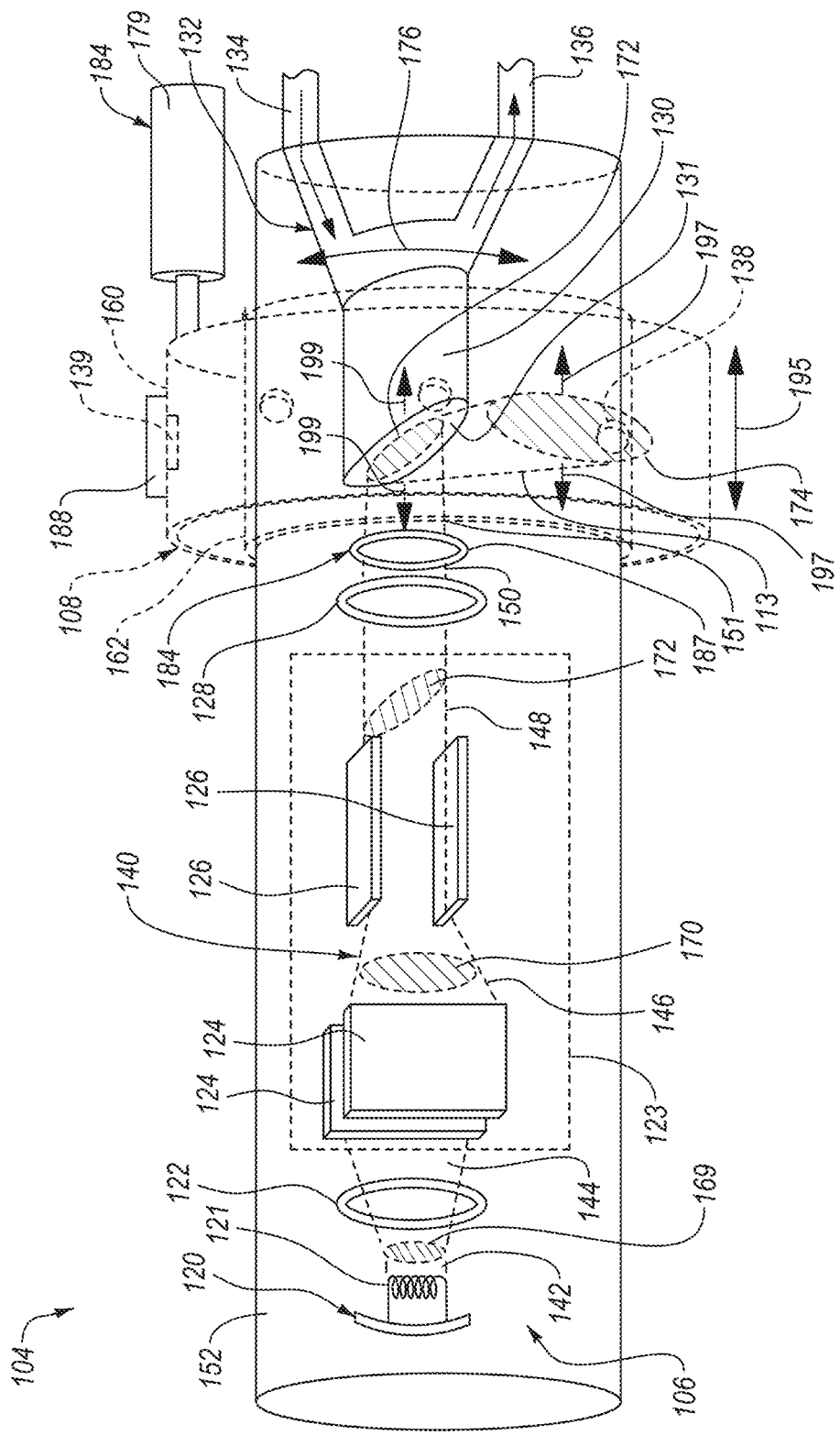
FIG. 3 is a schematic perspective view of the x-ray emitter of the x-ray backscatter apparatus of the system of FIG. 1, shown with an x-ray collimator of the x-ray emitter in dashed lines, according to one or more examples of the present disclosure.

The x-ray emitter 104 includes an x-ray source 106 and an x-ray collimator 108. The x-ray source 106 generates an uncollimated x-ray emission 113 (see, e.g., FIGS. 3 and 7) and the x-ray collimator 108 collimates the x-ray emission 113 to produce the collimated x-ray emission 112. Referring to FIG. 2, the x-ray source 106 includes a cathode 120, an emission shaping mechanism 123, and an anode 130. The cathode 120 is selectively operable to generate an electron emission 140 by heating the cathode 120 via a thermionic emission process. As shown in FIG. 3, in certain examples, the cathode 120 includes a filament 121 that when heated release highly-charged electrons. The electron emission 140 includes a mass of the highly-charged electrons (i.e., ions) all moving in the same general direction and collectively defining a cross-sectional shape of the electron emission 140. The movement or acceleration of the electrons is facilitated by the positive charge of the anode 130 relative to the negative charge of the cathode 120.

The electron emission 140 ultimately reaches and impacts the anode 130. The anode 130 acts to rapidly decelerate the highly-charged electrons of the electron emission 140. The rapid deceleration of the highly-charged electrons causes energy from the electrons to be released as heat and x-rays (or photons). Accordingly, the anode 130 effectively transforms the electron emission 140 into the uncollimated x-ray emission 113. Generally, the anode 130 is made of a material and powered to stop and absorb the electrons of the electron emission 140. In some examples, the anode 130 is made of tungsten. The x-rays of the uncollimated x-ray emission 113 emit from the anode 130 at a direction defined by an angle of a deflecting surface 131 of the anode 130 (see, e.g., FIG. 3). Moreover, the x-rays collectively form the uncollimated x-ray emission 113 and collectively define a cross-sectional shape of the uncollimated x-ray emission 113.

As shown in FIG. 2, before reaching the anode 130, the electron emission 140 passes through the emission shaping mechanism 123, which is configured to adjust the cross-sectional shape of the electron emission 140 as is explained in more detail below. In the illustrated example, the emission shaping mechanism 123 includes a first pair of deflection plates 124 and a second pair of deflection plates 126. The second pair of deflection plates 126 are downstream of the first pair of deflection plates 124. The x-ray source 106 also includes one or more alignment coils that are configured to adjust a directionality of the electron emission 140 relative to the anode 130. In the illustrated example, the x-ray source 106 includes a first alignment coil 122 and a second alignment coil 128. The first alignment coil 122 is upstream of the first pair of deflection plates 124 and the second alignment coil 128 is downstream of the second pair of deflection plates 126. As used herein, downstream is the direction of the arrows representing the electron emission 140 in FIG. 2 and upstream is a direction opposite the direction of these arrows.

In the illustrated example, the x-ray collimator 108 of the x-ray emitter 104 includes a collimator ring 160 with a plurality of emission apertures 138. The collimator ring 160, which can also be termed an aperture ring, receives the uncollimated x-ray emission 113 and blocks the uncollimated x-ray emission 113 except for a portion of the uncollimated x-ray emission 113 that is allowed to pass through the collimator ring 160 via one emission aperture 138 at a time as the collimator ring 160 rotates. The portion of the uncollimated x-ray emission 113 passing through an emission aperture 138 becomes the collimated x-ray emission 112 that is directed to the part 102.

The electron emission 140 experiences adjustments as it passes from the cathode 120 to the anode 130. Accordingly, the electron emission 140 can be divided into multiple portions each corresponding with the adjustment that the immediately upstream feature imparted to the electron emission 140. Referring to FIG. 2, the electron emission 140 includes a non-adjusted portion 142 downstream of the cathode 120 and upstream of the first alignment coil 122. The electron emission 140 additionally includes a first redirected portion 144, downstream of the first alignment coil 122 and upstream of the first pair of deflection plates 124, a first reshaped portion 146, downstream of the first pair of deflection plates 124 and upstream of the second pair of deflection plates 126, and a second shaped portion 148, downstream of the second pair of deflection plates 126 and upstream of the second alignment coil 128. The electron emission 140 also includes a second redirected portion 150, downstream of the second alignment coil 128 and upstream of the anode 130.

As shown in FIG. 3, the non-adjusted portion 142 of the electron emission 140 has a circular cross-sectional shape 169. In other words, the cathode 120, or the filament 121 of the cathode 120, generates an electron emission with a circular cross-sectional shape 169. The non-adjusted portion 142 of the electron emission 140 passes through the first alignment coil 122. In some examples, the first alignment coil 122 has an annular or ring-like shape and the electron emission 140 passes through the interior space defined by the ring-like shape.

As the electron emission 140 passes through the first alignment coil 122, the first alignment coil 122 adjusts the directionality of the electron emission 140 or changes the direction in which the electron emission 140 travels. According to certain examples, the first alignment coil 122 adjusts the directionality of the electron emission 140 by providing a magnetic field that slightly deflects the electron emission 140. As described below, slightly deflecting the electron emission 140 in this manner helps to optimize the alignment of the x-ray emission 113 with the emission apertures 138 of the collimator ring 160. Moreover, the first alignment coil 122, and the corresponding adjustment to the directionality of the electron emission 140, can be controlled by the controller 116. Generally, in addition to helping align the x-ray emission 113 with the emission apertures 138 of the collimator ring 160, the directionality of the electron emission 140 is adjusted by the first alignment coil 122 to ensure the electron emission 140 passes through the emission shaping mechanism 123 in a direction appropriate for shaping. The first redirected portion 144 of the electron emission 140, although potentially traveling in a different direction, has the same circular cross-sectional shape 169 as the non-adjusted portion 142 of the electron emission 140. Additionally, the first alignment coil 122 is capable of adjusting a cross-sectional diameter of the electron emission 140 if desired.

The first redirected portion 144 of the electron emission 140 is received by (e.g., passes between) the first pair of deflection plates 124. The deflection plates 124 of the first pair of deflection plates 124 are parallel to and spaced apart from each other. Each deflection plate 124 of the first pair of deflection plates 124 is configured to generate an electromagnetic field. The electromagnetic fields are directed across the electron emission 140 in a direction perpendicular to the flow direction of the electrons of the electron emission 140. The electromagnetic fields interact with the electrons and cause them to shift in the direction of the electromagnetic fields, which results in a change of the overall cross-sectional shape of the electron emission 140. More specifically, as the electron emission 140 passes between the deflection plates 124, the electromagnetic fields generated by the deflection plates 124 acts to increase a first dimension (e.g., length or diameter) of the circular cross-sectional shape 169 and leave a second dimension (e.g., width or diameter), that is perpendicular to the first dimension, of the circular cross-sectional shape 169 the same.

Figure 5:
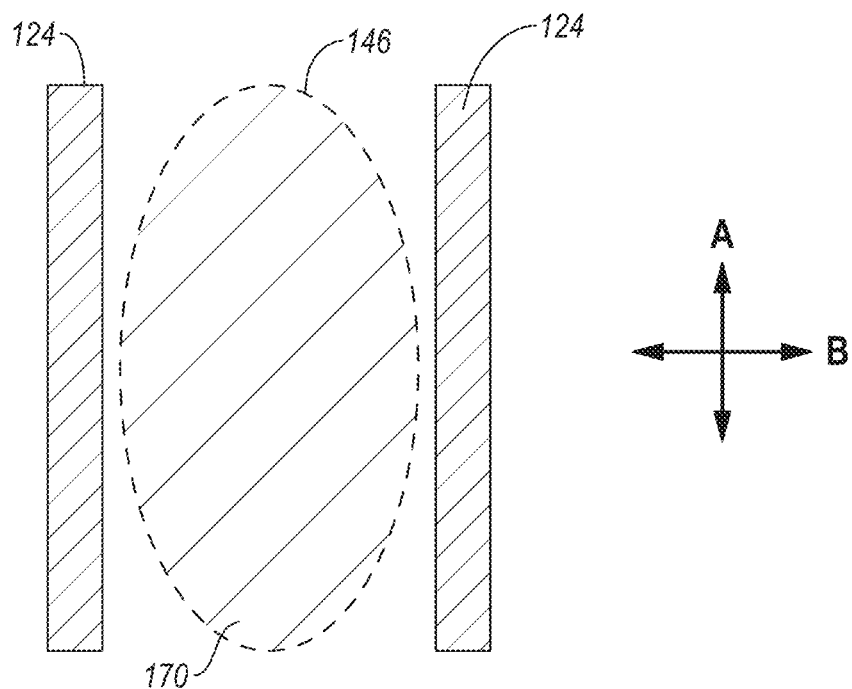
FIG. 5 is a schematic cross-sectional side view of a first pair of deflection plates, taken along line 5-5 of FIG. 4, according to one or more examples of the present disclosure.

Because the circular cross-sectional shape 169 is circular, the first pair of deflection plates 124 increases the diameter of the cross-sectional shape of the first redirected portion 144 along a first plane A and maintains the diameter of the cross-sectional shape of the first redirected portion 144 along a second plane B perpendicular to the first plane (see, e.g., FIG. 5). Increasing the first dimension (e.g., length) of the circular cross-sectional shape 169 and maintaining the second dimension (e.g., width) of the circular cross-sectional shape 169 results in an elliptical cross-sectional shape. Accordingly, the first reshaped portion 146 of the electron emission 140 exiting the first pair of deflection plates 124 has an initial elliptical cross-sectional shape 170 or a shape that is elongated in one direction but not in another perpendicular direction.

After exiting the first pair of deflection plates 124, the first reshaped portion 146 of the electron emission 140 is received by (e.g., passes between) the second pair of deflection plates 126. The deflection plates 126 of the second pair of deflection plates 126 are parallel to and spaced apart from each other. Like the deflection plates 124, each deflection plate 126 of the first pair of deflection plates 126 is configured to generate an electromagnetic field that results in a change of the overall cross-sectional shape of the electron emission 140. However, the orientation of the second pair of deflection plates 126 is different than that of the first pair of deflection plates 124. The deflection plates 124 of the first pair of deflection plates 124 are parallel to each other and the first plane A and parallel to the flow direction of the electron emission 140. Similarly, the deflection plates 126 of the second pair of deflection plates 126 are parallel to each other and the second plane B and parallel to the flow direction of the electron emission 140. However, the first plane A is perpendicular to the second plane B in some examples.

Figure 6:
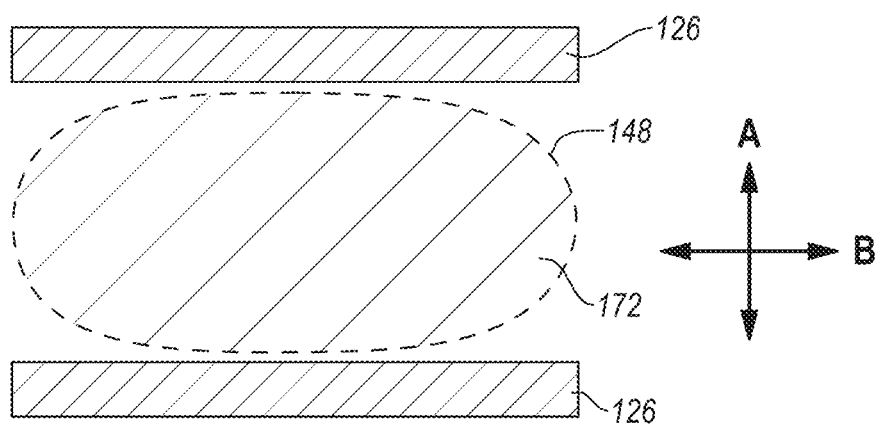
FIG. 6 is a schematic cross-sectional side view of a first pair of deflection plates, taken along line 6-6 of FIG. 4, according to one or more examples of the present disclosure.

Therefore, as the electron emission 140 passes between the deflection plates 126, the electromagnetic fields generated by the deflection plates 126 act to decrease the second dimension (e.g., width) of the initial elliptical cross-sectional shape 170, now along the first plane A, and leave the first dimension (e.g., length), that is perpendicular to the second dimension and now along the second plane B, of the initial elliptical cross-sectional shape 170 the same (see, e.g., FIG. 6). Decreasing the second dimension (e.g., width) of the initial elliptical cross-sectional shape 170 and maintaining the first dimension (e.g., length) of the initial elliptical cross-sectional shape 170 results in a more elongated elliptical cross-sectional shape. Accordingly, the second shaped portion 148 of the electron emission 140 exiting the second pair of deflection plates 126 has a final elliptical cross-sectional shape 172 or a shape that is more elliptical (e.g., a higher length-to-width ratio) than the initial elliptical cross-sectional shape 170.

The second shaped portion 148 of the electron emission 140 with the final elliptical cross-sectional shape 172 exits the second pair of deflection plates 126 and passes through the second alignment coil 128. In some examples, the second alignment coil 128 is similar to or the same as the first alignment coil 122. For example, as the electron emission 140 passes through the second alignment coil 128, the second alignment coil 128 adjusts the directionality of the electron emission 140 or changes the direction in which the electron emission 140 travels. Like the first alignment coil 122, the second alignment coil 128, and the corresponding adjustment to the directionality of the electron emission 140, can be controlled by the controller 116. Generally, the directionality of the electron emission 140 is adjusted by the second alignment coil 128 to ensure the electron emission 140 impacts the deflecting surface 131 of the anode 130 at a desired (e.g., centered) location on the anode 130. The second redirected portion 150 of the electron emission 140, although potentially traveling in a different direction, has the same final elliptical cross-sectional shape 172 as the second shaped portion 148 of the electron emission 140.

Referring back to FIG. 1, in some examples, the x-ray backscatter apparatus 101 further includes at least one emission alignment adjuster 184. Generally, the emission alignment adjuster 184 is operable to adjust a position of the uncollimated x-ray emission 113 relative to the plurality of emission apertures 138. In one example, the x-ray backscatter apparatus 101 includes on emission alignment adjuster 184. However, in other examples, the x-ray backscatter apparatus 101 includes more than one emission alignment adjuster 184, such as two emission alignment adjusters 184. Accordingly, although FIGS. 2 and 3 show an x-ray backscatter apparatus 101 that includes two emission alignment adjusters 184, in some examples, the x-ray backscatter apparatus 101 includes only one of the two emission alignment adjusters 184 shown in FIGS. 2 and 3. The emission alignment adjuster 184 can be any of various types of mechanisms, components, systems, or assemblies capable of adjusting a position of the uncollimated x-ray emission 113 relative to the plurality of emission apertures 138 as defined below. However, in one example, the emission alignment adjuster 184 is one of an alignment-adjustment coil 187 or a linear actuator 179.

The alignment-adjustment coil 187 is positioned between the cathode 120 and the anode 130 in certain examples, and in the illustrated examples, positioned nearer the anode 130 than the second alignment coil 128. Accordingly, in the illustrated examples, the alignment-adjustment coil 187 is downstream of the second alignment coil 128 or between the second alignment coil 128 and the anode 130. The alignment-adjustment coil 187. The alignment-adjustment coil 187 is fixed relative to the cathode 120 and the anode 130 such that the alignment-adjustment coil 187 does not move relative to the cathode 120 and the anode 130.

Similar to the first alignment coil 122 and the second alignment coil 128, in some examples, the alignment-adjustment coil 187 has an annular or ring-like shape and the electron emission 140 passes through an interior space defined by the ring-like shape of the alignment-adjustment coil 187. As the electron emission 140 passes through the alignment-adjustment coil 187, the alignment-adjustment coil 187 adjusts the directionality of the electron emission 140 or changes the direction in which the electron emission 140 travels. Referring to FIG. 3, the direction is a linear direction 199 relative the anode 130. According to certain examples, the alignment-adjustment coil 187 adjusts the directionality of the electron emission 140 by generating an adjustable electromagnetic field that slightly deflects the electron emission 140, thus creating a third redirected portion 151, downstream of the alignment-adjustment coil 187. The deflection of the electron emission 140 corresponds with the intensity of the electromagnetic field, which is proportional to the electrical power supplied to the alignment-adjustment coil 187. Accordingly, the type of adjustment to the electron emission 140, by the alignment-adjustment coil 187, is considered an electrical adjustment. Deflecting the electron emission 140 in this manner helps to adjust the angle of the electron emission 140 relative to the deflecting surface 131 of the anode 130 and the location, in a linear direction, on the anode 130 that the electron emission 140 impacts, thereby adjusting the position of the uncollimated x-ray emission 113, in a linear direction 197, relative to the emission apertures 138 of the collimator ring 160 (see, e.g., FIG. 3). Moreover, the alignment-adjustment coil 187, and the corresponding adjustment to the directionality of the electron emission 140, can be controlled by the controller 116.

When the second redirected portion 150 of the electron emission 140, in examples where the x-ray backscatter apparatus 101 does not have an alignment-adjustment coil 187, or when the third redirected portion 151, in examples where the emission alignment adjuster 184 is an alignment-adjustment coil 187, impacts the deflecting surface 131 of the anode 130 it has the final elliptical cross-sectional shape 172. The deflecting surface 131 is flat. Accordingly, the uncollimated x-ray emission 113 generated by the anode 130 and deflected toward the x-ray collimator 108 also has an elliptical cross-sectional shape 174 that corresponds with the final elliptical cross-sectional shape 172. In some examples, the elliptical cross-sectional shape 174 of the uncollimated x-ray emission 113 is the same as the final elliptical cross-sectional shape 172 of the second redirected portion 150 or the third redirected portion 151 of the electron emission 140. Although the elliptical cross-sectional shape 174 is the same as the final elliptical cross-sectional shape 172, the size of the elliptical cross-sectional shape 174 is different (e.g., bigger) than the final elliptical cross-sectional shape 172 in some examples.

The deflecting surface 131 of the anode 130 is angled relative to the flow direction of the electron emission 140. Therefore, the flow direction of the uncollimated x-ray emission 113 is angled relative to the flow direction of the electron emission 140. Generally, the angle of the deflecting surface 131 of the anode 130 is selected such that the uncollimated x-ray emission 113 is directed to the x-ray collimator 108. In certain examples, the x-ray collimator 108 encircles the anode 130 and the flow direction of the uncollimated x-ray emission 113 is oblique (e.g., perpendicular) to the flow direction of the electron emission 140. As explained below, the orientation of the elliptical cross-sectional shape 174 of the uncollimated x-ray emission 113 is selected based on the location and orientation of the x-ray collimator 108 relative to the anode 130.

Figure 4:
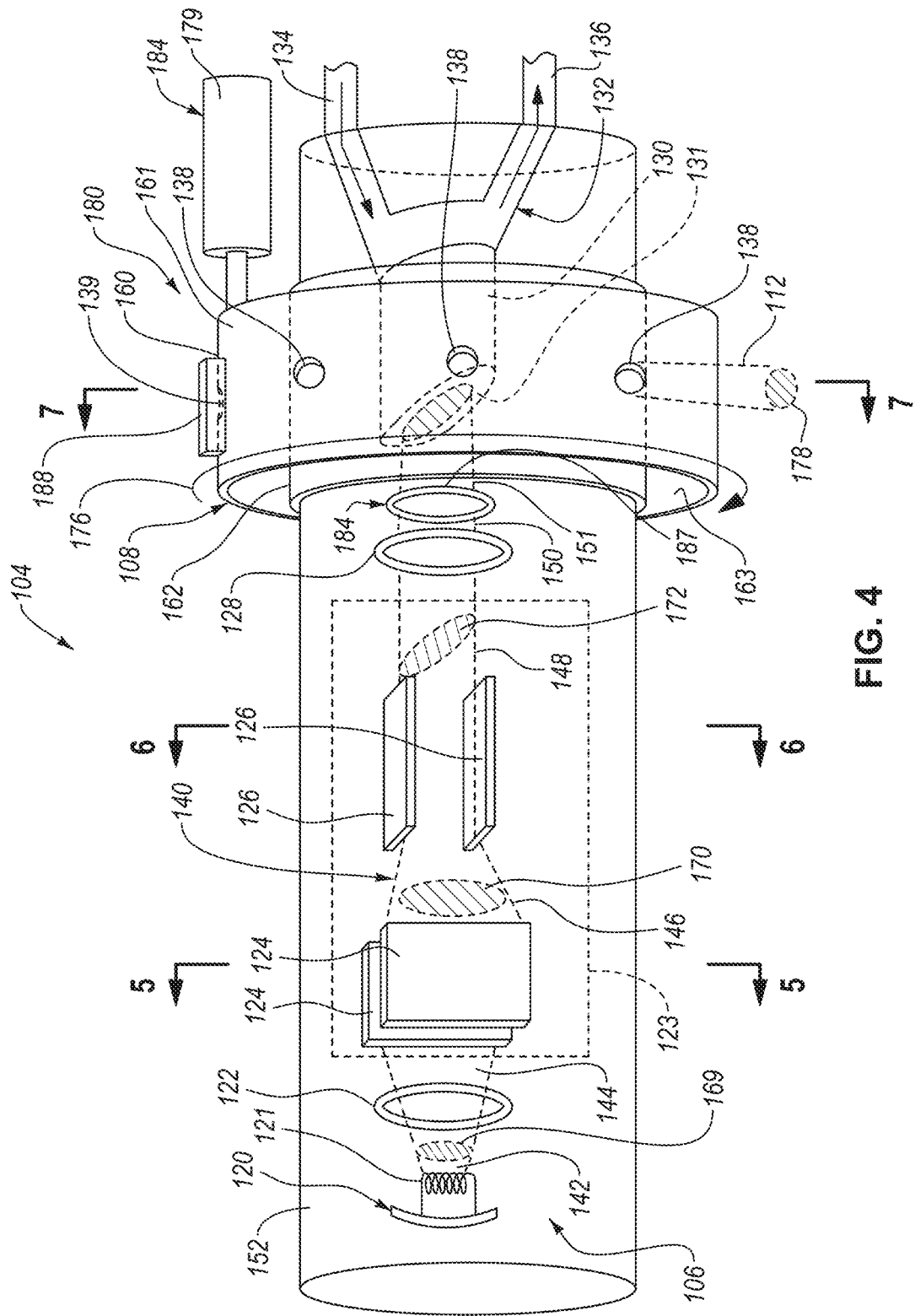
FIG. 4 is a schematic perspective view of the x-ray emitter of the x-ray backscatter apparatus of the system of FIG. 1, shown with the x-ray collimator of the x-ray emitter in solid lines, according to one or more examples of the present disclosure.
Figure 7:
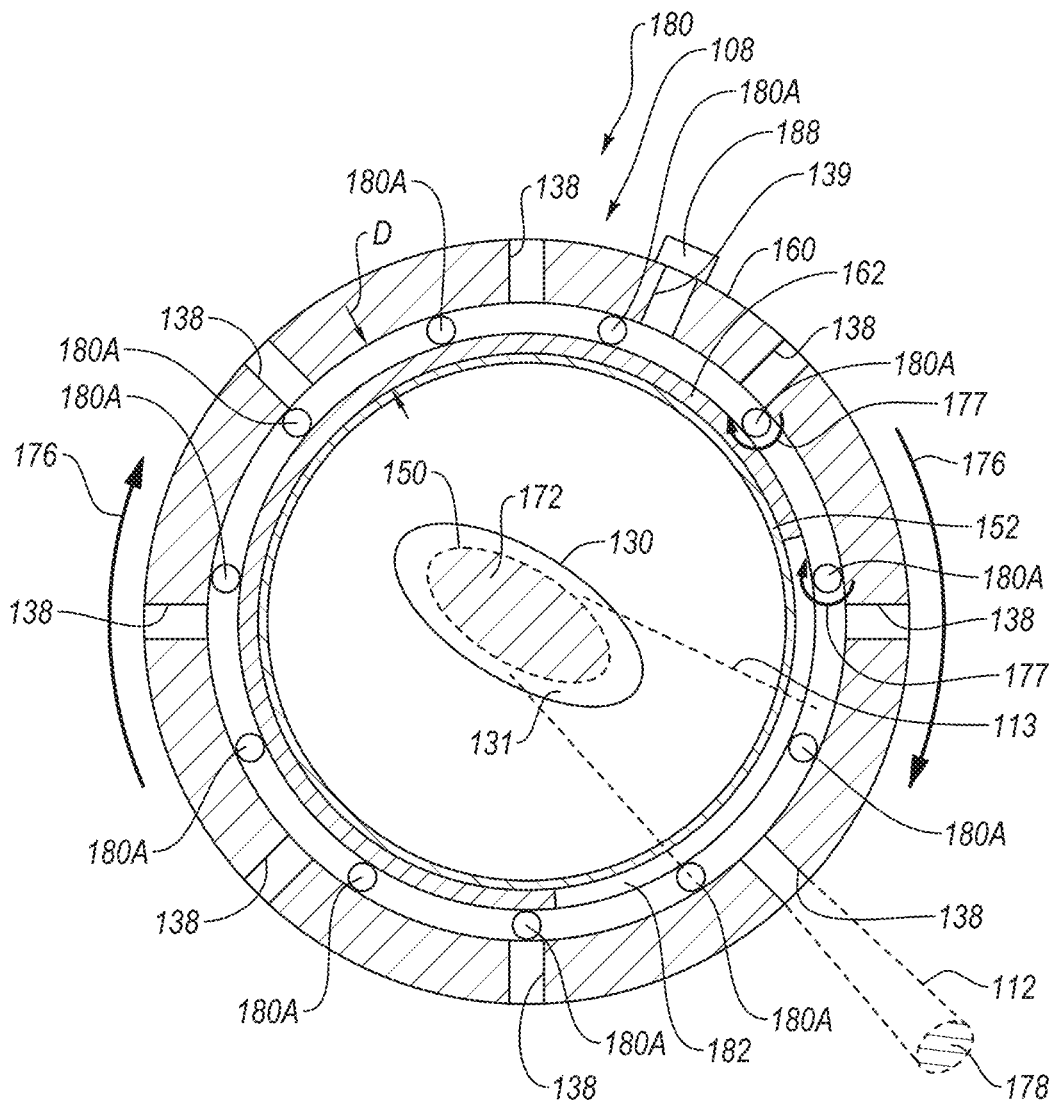
FIG. 7 is a schematic cross-sectional side view of an x-ray collimator and an anode, taken along line 7-7 of FIG. 4, according to one or more examples of the present disclosure.
Figure 9:
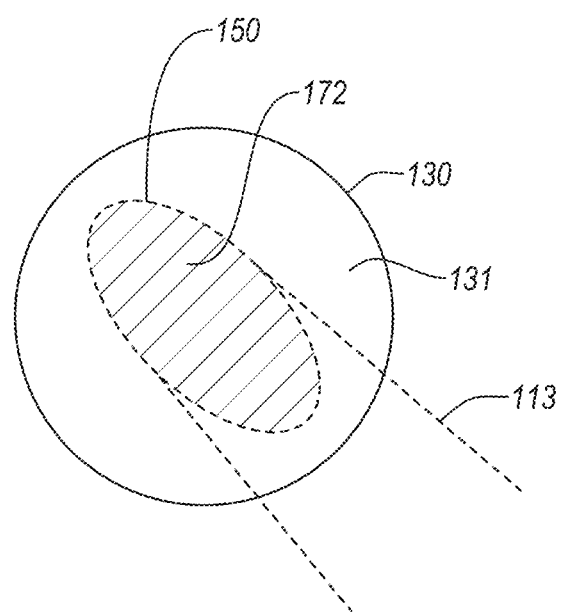
FIG. 9 is a schematic side view of an anode and uncollimated x-ray emission, according to one or more examples of the present disclosure.

The conversion of the electron emission 140 to the uncollimated x-ray emission 113 at the deflecting surface 131 of the anode 130 generates heat. Referring to FIGS. 2-4, in some examples, the heat is dissipated via a cooling system 132 of the x-ray source 106. The cooling system 132 includes an input 134 and an output 136. A cooled cooling fluid flows into thermal transferring contact with the anode 130 from the input 134 and collects heat from the anode 130. The heated cooling fluid then exits through the output 136. The amount of heat required to be dissipated by the cooling system 132 is dependent on the size of the anode 130. Accordingly, the smaller the anode 130, the less heat that is needed to be dissipated and the less complex or robust the cooling system 132 needs to be. Referring to FIG. 7, in some examples, the shape of the deflecting surface 131 is elliptical to correspond with the final elliptical cross-sectional shape 172 of the electron emission 140. Shaping the deflecting surface 131 in this manner helps to reduce the size of the anode 130 the amount of heat generated by the anode 130. However, as shown in FIG. 9, in certain examples, the shape of the deflecting surface 131 can be circular, or some other shape, that does not correspond with the final elliptical cross-sectional shape 172 of the electron emission 140.

Referring to FIGS. 3 and 4, the x-ray collimator 108 includes a collimator ring 160 and, in some examples, a support ring 162 or support wheel. The support ring 162 is concentric with and non-movably fixed directly to an exterior of a vacuum tube 152 of the x-ray backscatter apparatus 101. Accordingly, the x-ray collimator 108 is external to the vacuum tube 152. The vacuum tube 152 is a hollow, fully-enclosed, at least semi-transparent tube that houses the x-ray source 106. In some examples, the vacuum tube 152 is made of a transparent material, such as glass. The vacuum tube 152 has a tube-like shape that is elongated in the flow direction of the electron emission 140. The support ring 162 is fixed to the exterior of the vacuum tube 152 using any of various fixation techniques, such as fastening, adhering, bonding, and the like, that allow the support ring 162 to be supported directly by the vacuum tube 152. Moreover, the support ring 162 is fixed to the vacuum tube 152 at a location along the vacuum tube 152 that positions the support ring 162 to encircle the deflecting surface 131 of the anode 130. The support ring 162 is wide enough, in the linear direction 193 (see, e.g., FIG. 10A), to receive an entirety of the uncollimated x-ray emission 113 generated by the anode 130.

Figure 8:
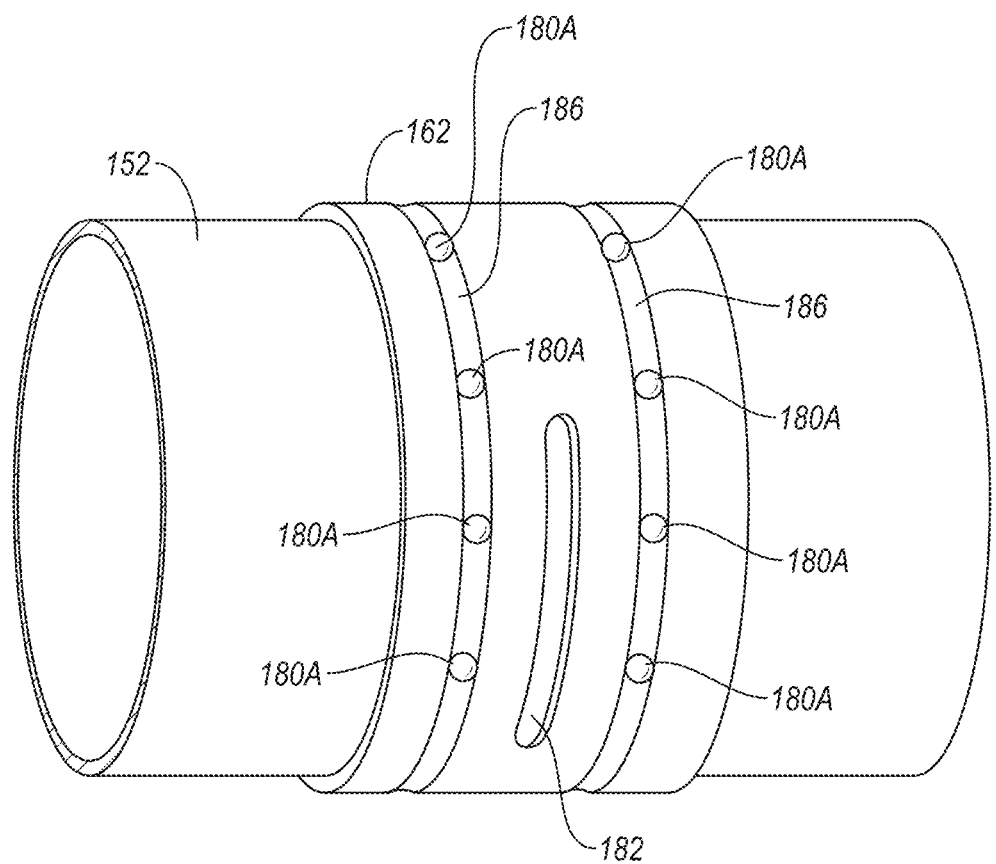
FIG. 8 is a schematic perspective view of a support ring and balls of an x-ray collimator, according to one or more examples of the present disclosure.

All or a portion of the uncollimated x-ray emission 113 received by the support ring 162 is allowed to pass through the support ring 162 via a slit 182 formed in the support ring 162 (see, e.g., FIGS. 7 and 8). In some examples, the slit 182 is elongated in a circumferential direction about at least a circumference of the support ring 162. In the illustrated example, slit 182 extends circumferentially along only a portion of the circumference of the support ring 162. However, in other examples, the support ring 162 is comprises of two halves and the slit 182 is defined between the two halves and extends along an entirety of the circumference of the support ring 162 to effectively divide the support ring 162 into the two halves.

Figure 10A:
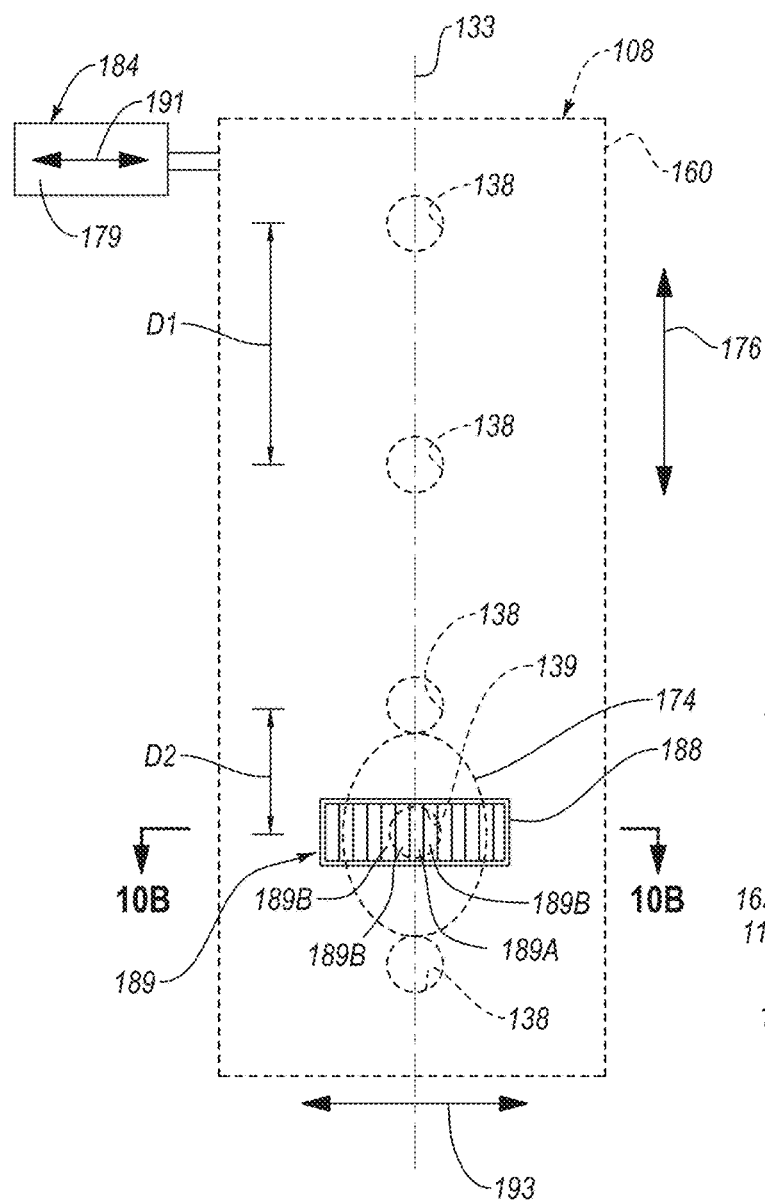
FIG. 10A is a schematic front elevation view of an x-ray collimator, shown in dashed lines, x-ray intensity sensor, and an emission alignment adjuster, according to one or more examples of the present disclosure.
Figure 10B:
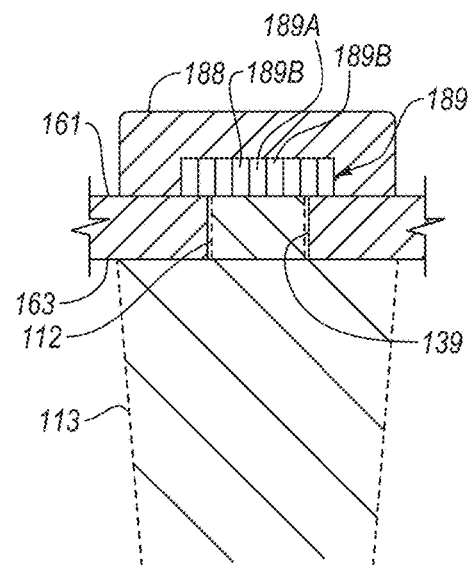
FIG. 10B is a schematic cross-sectional side elevation view of the x-ray collimator and x-ray intensity sensor of FIG. 10A, taken along the line 10B-10B of FIG. 10A, according to one or more examples of the present disclosure.

The collimator ring 160 includes at least one emission aperture 138, which a through-aperture. In certain examples, as shown, the collimator ring 160 includes multiple emission apertures 138 in a spaced apart arrangement along a circumference of the collimator ring 160. Referring to FIG. 10A, in some examples, each one of the plurality of emission apertures 138 is spaced apart, along the circumference of the collimator ring 160, from an adjacent one of the plurality of emission apertures 138 by a first distance D1. Accordingly, in such examples, the plurality of emission apertures 138 are uniformly spaced along the circumference of the collimator ring 160. Moreover, the plurality of emission apertures 138 are aligned with each other along the circumference of the collimator ring 160. More specifically, a plane 133 perpendicular to a rotational direction 176 of the collimator ring 160 passes through the plurality of emission apertures 138 at the same location on the emission apertures 138. Therefore, when each one of the plurality of emission apertures 138 has a symmetrical shape, the plane 133 bisects the plurality of emission apertures 138.

Each one of the emission apertures 138 has a cross-sectional size that is smaller than the size of the elliptical cross-sectional shape 174 of the uncollimated x-ray emission 113. Also, each one of the emission apertures 138 can have any of various symmetrical shapes, such as circular, or non-symmetrical shapes. The emission apertures 138 are circumferentially aligned with the slit 182 of the support ring 162.

The collimator ring 160, the support ring 162, and balls 180A of the x-ray collimator 108 form a ball bearing assembly 180 or rolling-element bearing assembly. The collimator ring 160, which acts as the first race of the ball bearing assembly 180, is movably supported on the support ring 162, which acts as the second race of the ball bearing assembly 180, by balls 180A. Accordingly, the balls 180A are interposed between the collimator ring 160 and the support ring 162, which also results in the balls 180A being interposed between the collimator ring 160 and the vacuum tube 152. In this manner, the collimator ring 160 is movably supported on the vacuum tube 152 by the balls 180A. As shown in FIG. 8, the balls 180A of the ball bearing assembly 180 are circumferentially spaced apart from each other. For stability, in some examples and as shown, the balls 180A are divided into at least two circumferential sets that are spaced apart from each other along a length of the vacuum tube 152. The balls 180A are designed to roll along the collimator ring 160, acting as the first trace of the ball bearing assembly 180, and the support ring 162, acting as the second trace of the ball bearing assembly 180, in a circumferential direction. To maintain movement of the balls 180A within a circumferential path, each of the surfaces of the collimator ring 160 and the support ring 162 that face each other include corresponding circumferential grooves 186, cages, or other guide structures, that maintain the balls 180A between the collimator ring and the support ring 162.

In view of the foregoing, the collimator ring 160 is supported on the balls 180A and concentrically encircles the support ring 162. Accordingly, the collimator ring 160 is concentric with the vacuum tube 152. The balls 180A roll, in rotational direction 177, along the collimator ring 160 in the circumferential direction to facilitate low-friction rotation of the collimator ring 160 relative to the support ring 162 and the vacuum tube 152. In other words, the collimator ring 160 is movable (e.g., rotatable) about the support ring 162 and the vacuum tube 152, in the rotational direction 176, via engagement with the balls 180A. The collimator ring 160 is radially spaced apart from the support ring 162 by a dimension of the balls 180A. In other words, the collimator ring 160 is in close proximity to the support ring 162. Moreover, because the support ring 162 is affixed onto the vacuum tube 152, the collimator ring 160 is also in close proximity to the vacuum tube 152. In fact, the collimator ring 160 is radially spaced from the vacuum tube 152 by a distance D equal to the dimension (e.g., a diameter or a portion of the diameter) of the balls 180A and a thickness of the support ring 162 (see, e.g., FIG. 7). In some examples, the distance D is between 1 mm and 100 mm. According to one specific example, the distance D is between 5 mm and 20 mm. Although a ball bearing arrangement is shown and described, in other examples, the support ring 162 can be rotatably mounted on the vacuum tube 152 using other comparable techniques.

The elliptical cross-sectional shape 174 of the uncollimated x-ray emission 113 is oriented such that the elliptical cross-sectional shape 174 is elongated along a circumference of the support ring 162. In this manner, the elliptical cross-sectional shape 174 is elongated along the slit 182. Accordingly, a larger quantity or concentration of the uncollimated x-ray emission 113 is allowed to pass through the slit 182, compared to an emission with a circular cross-sectional shape. With the elliptical cross-sectional shape 174 elongated along the circumference of the support ring 162, the elliptical cross-sectional shape 174 is also elongated along a circumference of the collimator ring 160 and a length of the elliptical cross-sectional shape 174 is parallel with the rotational direction 176. In this manner, a larger quantity or concentration of the uncollimated x-ray emission 113 is circumferentially aligned with the emission apertures 138 of the collimator ring 160, which helps to reduce wasted energy by reducing the portion of the uncollimated x-ray emission 113 blocked by the collimator ring 160.

The collimator ring 160 rotates in the rotational direction 176 about the vacuum tube 152 as shown in FIGS. 4 and 7. As the collimator ring 160 rotates, the emission apertures 138 pass over the slit 182 of the support ring 162 one by one. As one emission aperture 138 passes over the slit 182, a portion of the uncollimated x-ray emission 113 passing through the slit 182 also passes through the emission aperture 138 generate the collimated x-ray emission 112. The cross-sectional shape of the collimated x-ray emission 112 corresponds with the shape of the emission aperture 138. In the illustrated example, the emission apertures 138 are circular, which generates a circular cross-sectional shape 178 of the collimated x-ray emission 112. As the emission aperture 138 passes over the slit 182, different portions of the uncollimated x-ray emission 113 pass through the emission aperture 138 to effectively translationally move the collimated x-ray emission 112 in a linear path, parallel with the rotational direction 176, along the part 102. Then another emission aperture 138 passes over the slit 182 and produces a similarly translationally moving collimated x-ray emission 112.

Due to the elongated nature and orientation of the elliptical cross-sectional shape 174 of the uncollimated x-ray emission 113, more of the uncollimated x-ray emission 113 passes through an emission aperture 138 as it passes over the slit 182. Because more of the uncollimated x-ray emission 113 passes through the emission apertures 138 to form the collimated x-ray emission 112, less energy is wasted and thus less energy is needed to generate the electron emission 140 for a collimated x-ray emission 112 of a given energy level. Accordingly, the energy supplied to the x-ray backscatter apparatus 101 and x-ray backscatter system 100 can be reduced, which enables the operational costs, weight, and size of the x-ray backscatter apparatus 101 to also be reduced. For example, the cooling system 132 can be simplified and reduced in size because, with less energy being supplied to the x-ray backscatter apparatus 101 (which results in the electron emission 140 having less energy), the anode 130 of the x-ray backscatter apparatus 101 is generating less heat.

Due to the dispersion of x-rays of the uncollimated x-ray emission 113 after being generated by the anode 130 but before being collimated by the x-ray collimator 108, the intensity distribution of the uncollimated x-ray emission 113 varies across a cross-section of the uncollimated x-ray emission 113 (see, e.g., the x-ray intensity chart 141 of FIGS. 11-14 where I(x) is the intensity of the uncollimated x-ray emission 113 at a position P(x), corresponding with the pixels 189, along the cross-section of the uncollimated x-ray emission 113). The uncollimated x-ray emission 113 has a peak intensity, often located at a geometric center of the cross-section of the uncollimated x-ray emission 113. The intensity of the uncollimated x-ray emission 113 decreases away from the peak intensity. To promote a maximum x-ray beam flux through the emission apertures 138, which increases the efficiency of the x-ray backscatter apparatus 101 and reduces wasted energy, it is desirable to have the uncollimated x-ray emission 113 positioned relative to each one of the emission apertures 138 such that the peak intensity of the uncollimated x-ray emission 113 is aligned (e.g., centered) with each one of the emission apertures 138. However, during operation, handling, or transportation of the x-ray backscatter apparatus 101, the position of the uncollimated x-ray emission 113 relative to the collimator ring 160 can change (e.g., shift or migrate) such that the peak intensity of the uncollimated x-ray emission 113 is misaligned or not centered with each one of the emission apertures 138, thereby resulting in a drop in the x-ray beam flux through the emission apertures 138, a reduction in the efficiency of the x-ray backscatter apparatus 101, and an increase in wasted energy.

The features and interoperability of the emission alignment adjuster 184 and an x-ray intensity sensor 188 of the x-ray backscatter apparatus 101 help to maintain or reestablish alignment of the peak intensity of the uncollimated x-ray emission 113 with the emission apertures 138 of the collimator ring 160.

As shown in FIGS. 2-4 and 10A, in some examples, the emission alignment adjuster 184 is a linear actuator 179, which can be used as the sole alignment adjuster 184 or in conjunction with other alignment adjusters 184, such as the alignment-adjustment coil 187 described above. The linear actuator 179 is fixed relative to the anode 130. For example, the linear actuator 179 can be coupled to the vacuum tube 152. The linear actuator 179 is also coupled to the collimator ring 160 and operable to translationally move the collimator ring 160, which includes the emission apertures 138 and the detection aperture 139, relative to the anode 130. The linear actuator 179 can be any of various actuators or actuation mechanisms, such as pneumatic, magnetic, electromagnetic, hydraulic cylinders, worm screws, positioning jack screws, and the like, that, when actuated, produce a linearly-directed motive force, as indicated by directional arrow 191. The linearly-directed motive force is transferred to the collimator ring 160 to produce linear translational movement of the collimator ring 160 in the linear direction 193, as shown in FIG. 10A. Moreover, the coupling between the linear actuator 179 and the collimator ring 160 enables synchronous or asynchronous rotation of the collimator ring 160, in the rotational direction 176, and linear translational movement of the collimator ring 160, in the linear direction 193. Such a coupling can include rails, bearings, tracks, and the like. Because mechanical force is employed by the linear actuator 179 to move the collimator ring 160, such adjustment is considered a mechanical adjustment.

Referring to FIGS. 2 and 3, the x-ray intensity sensor 188 is fixed to the x-ray collimator 108 over a detection aperture 139 of the x-ray collimator 108. As shown in FIG. 10A, the detection aperture 139 is formed in the collimator ring 160 of the x-ray collimator 108. Moreover, the detection aperture 139 is aligned with the emission apertures 138 along the circumference of the collimator ring 160. In other words, the plane 133 passes through the detection aperture 139 at the same location as that of the emission apertures 138, and can bisect the detection aperture 139 while bisecting the emission apertures 138. Moreover, the detection aperture 139 has the same size and shape as that of each one of the emission apertures 138. In other words, in some examples, the detection aperture 139 replicates the emission apertures 138 in size and shape.

The collimator ring 160 includes multiple emission apertures 138, but only one detection aperture 139. The detection aperture 139 is interposed between an adjacent two of the emission apertures 138, such that the detection aperture 139 is spaced apart, along the circumference of the collimator ring 160, from either one of the adjacent two of the emission apertures 138 by a second distance D2. The second distance D2 is less than the first distance D1. As the collimator ring 160 rotates, the detection aperture 139 eventually passes over the slit 182 of the support ring 162 and a portion of the uncollimated x-ray emission 113 passing through the slit 182 also passes into the detection aperture 139.

The x-ray intensity sensor 188 is fixed to a radially outwardly directed surface 161 of the collimator ring 160 at a location that covers the detection aperture 139 (see, e.g., FIG. 4). Accordingly, the detection aperture 139 is open on a radially inwardly directed surface 163 of the collimator ring 160, facing the anode 130 (see, e.g., FIG. 4), and closed, by the x-ray intensity sensor 188, on the radially outwardly directed surface 161 of the collimator ring 160, which faces away from the anode 130. The x-ray intensity sensor 188 is fixed to the collimator ring 160 such that the x-ray intensity sensor 188 rotates about the anode 130 as the collimator ring 160 rotates about the anode 130. In other words, the x-ray intensity sensor 188 is co-movable relative to the collimator ring 160. The x-ray intensity sensor 188 can be fixed to the collimator ring 160 using any of various fixation techniques or tools, such as via fasteners, bonding, welding, or the like.

The x-ray intensity sensor 188 is configured to detect the intensity of the uncollimated x-ray emission 113 passing into the detection aperture 139. Accordingly, the x-ray intensity sensor 188 includes a plurality of pixels 189 that face or are open to the detection aperture 139, which enables the x-rays of the uncollimated x-ray emission 113 to impact and be sensed by the plurality of pixels 189. Each one of the pixels 189 is configured to detect an intensity of the uncollimated x-ray emission 113 independently of any other one of the plurality of pixels 189. Accordingly, each pixel 189 acts as an individual sensor or sensing element. In some examples, each pixel 189 includes a scintillator (e.g., solid state crystal) and an optical detector that detects intensity of the light emitted by the scintillator when the scintillator is impacted by x-rays. According to other examples, each pixel 189 is a silicon detector coupled with a CsI (cesium iodide) scintillator that detects the intensity of x-rays by wavelength conversion. The x-ray intensity sensor 188 is a so-called radiation hardened sensor, in some examples, because the x-ray intensity sensor 188 is configured to receive and block the uncollimated x-ray emission 113. In this manner, the x-ray intensity sensor 188 prevents the uncollimated x-ray emission 113 entering the detection aperture 139 from exiting the detection aperture 139. Additionally, the x-ray intensity sensor 188 includes radiation shields that shield electronic components, such as wireless transceivers, processors, and/or other silicon chips, from being impacted by the x-rays of the uncollimated x-ray emission 113.

When the x-ray intensity sensor 188 is attached to the collimator ring 160, the pixels 189 are arranged linearly in the linear direction 193, which is perpendicular to the rotational direction 176 of the collimator ring 160, in a side-by-side manner. Accordingly, the pixels 189 arranged in a side-by-side manner along a width of the collimator ring 160, and thus across a width of the detection aperture 139. The plurality of pixels 189 includes a central pixel 189A and a plurality of side pixels 189B on opposite sides of the central pixel 189A. In other words, the central pixel 189A is interposed between multiple side pixels 189B. The central pixel 189A is so designated because the plane 133 passes through (e.g., bisects) the central pixel 189A. In this manner, the central pixel 189A is aligned with and spans a center of the detection aperture 139, in a direction parallel with the rotational direction 176, and the side pixels 189B span off-center portions of the detection aperture 139, in a direction parallel with the rotational direction 176. Therefore, the entirety of the detection aperture 139 is covered by the pixels 189.

Figure 12:
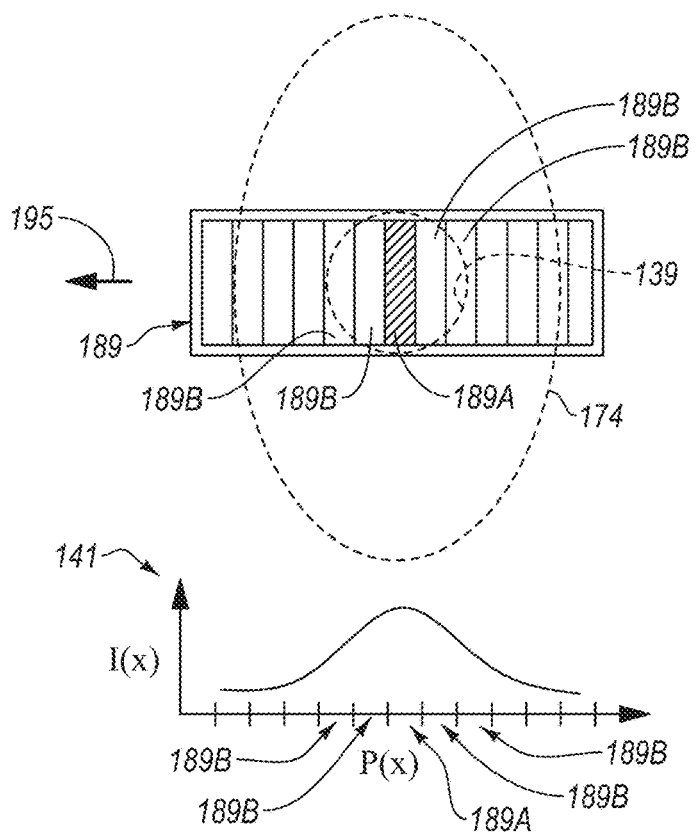
FIG. 12 is a schematic front elevation view of an x-ray intensity sensor and a corresponding x-ray intensity chart, when an uncollimated x-ray emission is aligned, according to one or more examples of the present disclosure.
Figure 13:
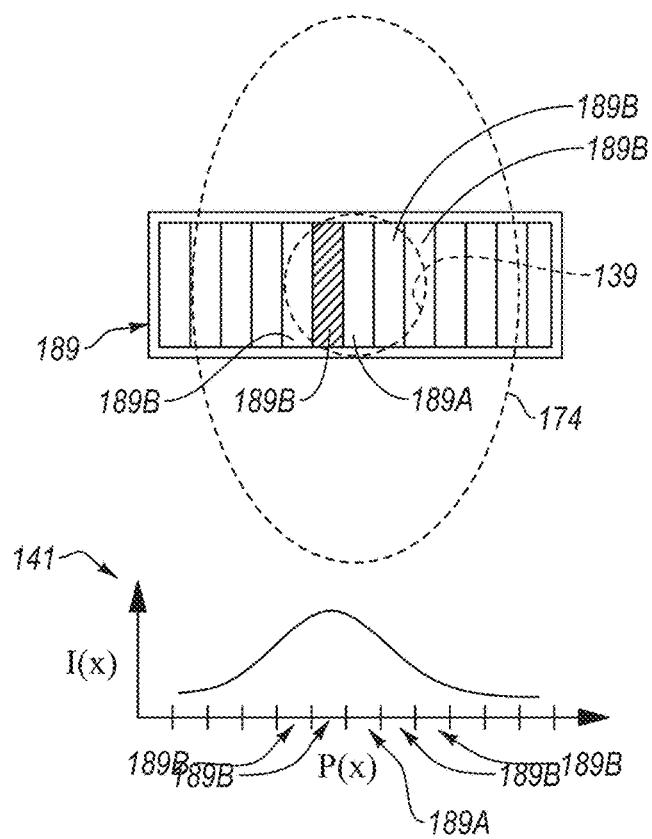
FIG. 13 is a schematic front elevation view of an x-ray intensity sensor and a corresponding x-ray intensity chart, when an uncollimated x-ray emission is misaligned, according to one or more examples of the present disclosure.

Referring to FIG. 13, as the collimator ring 160 rotates and the detection aperture 139 receives a portion of the uncollimated x-ray emission 113, the pixels 189 of the x-ray intensity sensor 188 detect an intensity of the uncollimated x-ray emission 113 at different locations along a cross-section of the uncollimated x-ray emission 113 passing into the detection aperture 139. The intensities of the uncollimated x-ray emission 113 detected by the pixels 189 are compared, such as by the controller 116, which can include a processor onboard or remote from the x-ray intensity sensor 188, to determine which of the pixels 189 detected the highest intensity. The location of the pixel 189 that detected the highest intensity corresponds with the location of the peak intensity of the uncollimated x-ray emission 113. If the highest intensity is detected by the central pixel 189A, as graphically illustrated by shading in FIGS. 12 and 14, then the peak intensity of the uncollimated x-ray emission 113 is aligned with the detection aperture 139 and thus is aligned with the emission apertures 138. However, if the highest intensity is detected by a pixel 189 other than the central pixel 189A, such as one of the side pixels 189B, as graphically illustrated by shading in FIGS. 11 and 13, then the peak intensity of the uncollimated x-ray emission 113 is not aligned with the detection aperture 139 and thus is not aligned with the emission apertures 138.

The controller 116 of the x-ray backscatter system 100 receives detected x-ray intensity data from the x-ray intensity sensor 188 and adjusts the position of the uncollimated x-ray emission 113, relative to the emission apertures 138 and the detection aperture 139, in response to a position, relative to the detection aperture 139, of the peak intensity of the uncollimated x-ray emission 113 passing into the detection aperture 139, as detected by the x-ray intensity sensor 188 and indicated in the detected x-ray intensity data. More specifically, the controller 116 adjusts the position of the uncollimated x-ray emission 113, relative to the emission apertures 138 and the detection aperture 139 when the detected x-ray intensity data indicates the peak intensity of the uncollimated x-ray emission 113 is misaligned relative to the detection aperture 139. The controller 116 adjusts the position of the uncollimated x-ray emission 113 by controlling operation of one or more emission alignment adjusters 184.

Figure 11:
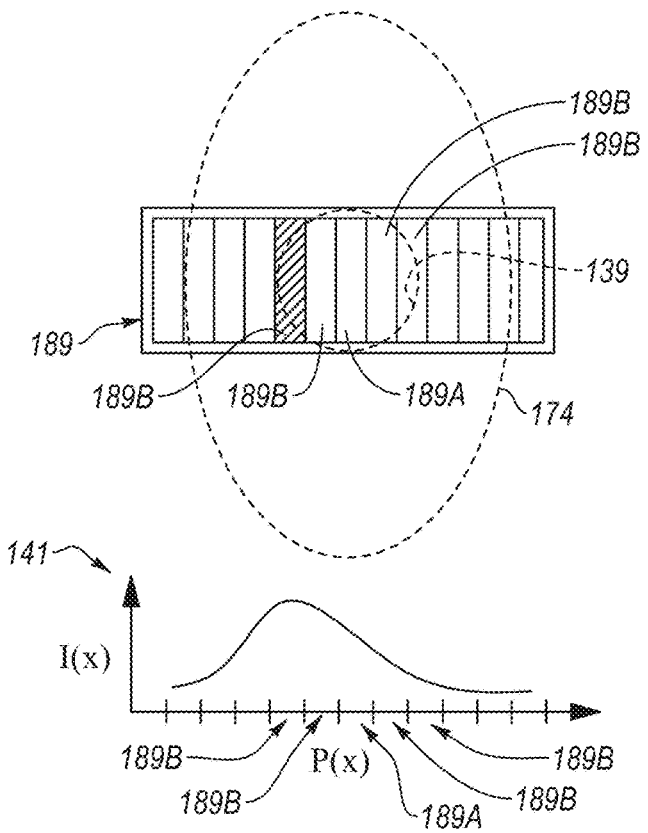
FIG. 11 is a schematic front elevation view of an x-ray intensity sensor and a corresponding x-ray intensity chart, when an uncollimated x-ray emission is misaligned, according to one or more examples of the present disclosure.

Referring to FIG. 11, according to one example, the detected x-ray intensity data from the x-ray intensity sensor 188 indicates the peak intensity of the uncollimated x-ray emission 113 is misaligned with the detection aperture 139 by at least a width of one pixel 189 but at most a width of two pixels 189 (e.g., because the side pixel 189B two away from the center pixel 189A detected the highest intensity). In this example, the controller 116 controls operation of the linear actuator 179 to linearly move the collimator ring 160 in the linear direction 195, which is parallel with the linear direction 193 of FIG. 10A, until the detected x-ray intensity data from the x-ray intensity sensor 188 indicates the peak intensity of the uncollimated x-ray emission 113 is aligned with the detection aperture 139 (e.g., until the center pixel 189A detects the highest intensity), as shown in FIG. 12. Although FIG. 11 shows the uncollimated x-ray emission 113 misaligned leftward of center and the linear direction 195 is in a leftward direction, in other examples, the uncollimated x-ray emission 113 can be misaligned rightward of center and the linear direction 195 can be in a rightward direction.

Figure 14:
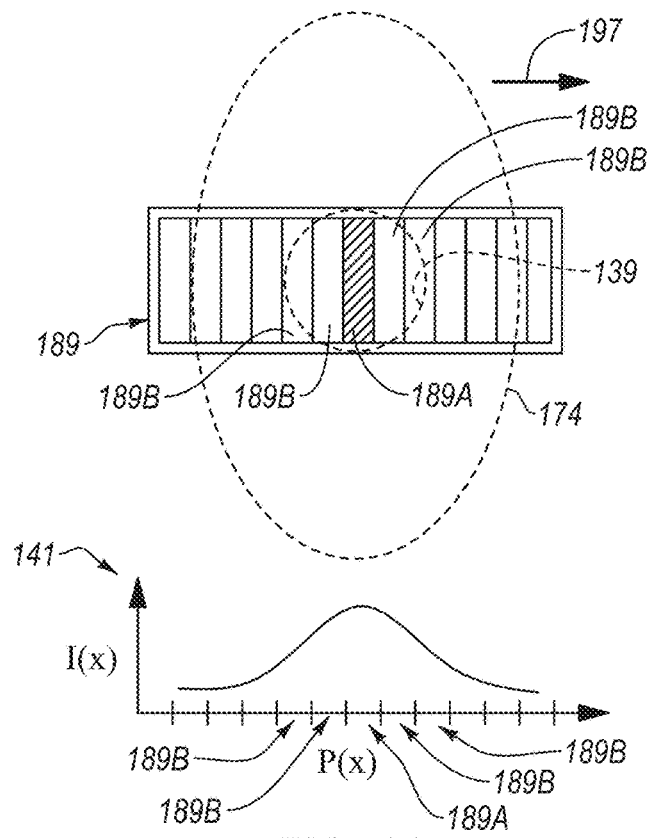
FIG. 14 is a schematic front elevation view of an x-ray intensity sensor and a corresponding x-ray intensity chart, when an uncollimated x-ray emission is aligned, according to one or more examples of the present disclosure.

Referring to FIG. 13, according to one example, the detected x-ray intensity data from the x-ray intensity sensor 188 indicates the peak intensity of the uncollimated x-ray emission 113 is misaligned with the detection aperture 139 by at most a width of a pixel (e.g., because the side pixel 189B next to the center pixel 189A detected the highest intensity). In this example, the controller 116 controls operation of the alignment-adjustment coil 187 to linearly move the uncollimated x-ray emission 113 in the linear direction 197, which is parallel with the linear direction 193 of FIG. 10A, until the detected x-ray intensity data from the x-ray intensity sensor 188 indicates the peak intensity of the uncollimated x-ray emission 113 is aligned with the detection aperture 139 (e.g., until the center pixel 189A detects the highest intensity), as shown in FIG. 14. Although FIG. 13 shows the uncollimated x-ray emission 113 misaligned leftward of center and the linear direction 197 is in a rightward direction, in other examples, the uncollimated x-ray emission 113 can be misaligned rightward of center and the linear direction 197 can be in a leftward direction.

In some examples, different emission alignment adjusters 184 are configured to adjust the position of the uncollimated x-ray emission 113, relative to the emission apertures 138, different distances. For example, one emission alignment adjuster 184 may be configured to adjust the position of the uncollimated x-ray emission 113 up to a first predetermined distance and another emission alignment adjuster 184 may be configured to adjust the position of the uncollimated x-ray emission 113 up to a second predetermined distance, which is different than the first predetermined distance. Then, the determination of which emission alignment adjuster 184 is used to effectuate an adjustment to the position of uncollimated x-ray emission 113 is based on the degree of misalignment of the uncollimated x-ray emission 113. According to some particular examples, the alignment-adjustment coil 187 is configured to make smaller adjustments to the position of the uncollimated x-ray emission 113 and the linear actuator 179 is configured to make relatively larger adjustments to the position of the uncollimated x-ray emission 113. More specifically, in certain examples, the alignment-adjustment coil 187 configured to adjust the position of the uncollimated x-ray emission 113, relative to the plurality of emission apertures 138, up to the first predetermined distance, and the linear actuator 179 is configured to adjust the position of the uncollimated x-ray emission 113, relative to the plurality of emission apertures 138, up to the second predetermined distance, where the second predetermined distance is greater than the first predetermined distance. Adjustment of the position of the uncollimated x-ray emission 113 can be executed by only one of or both of the alignment-adjustment coil 187 and the linear actuator 179. In examples where adjustment of the position of the uncollimated x-ray emission 113 is executed by both of the alignment-adjustment coil 187 and the linear actuator 179, adjustment can be executed synchronously, in some examples, and, asynchronously in other examples.

Figure 15:
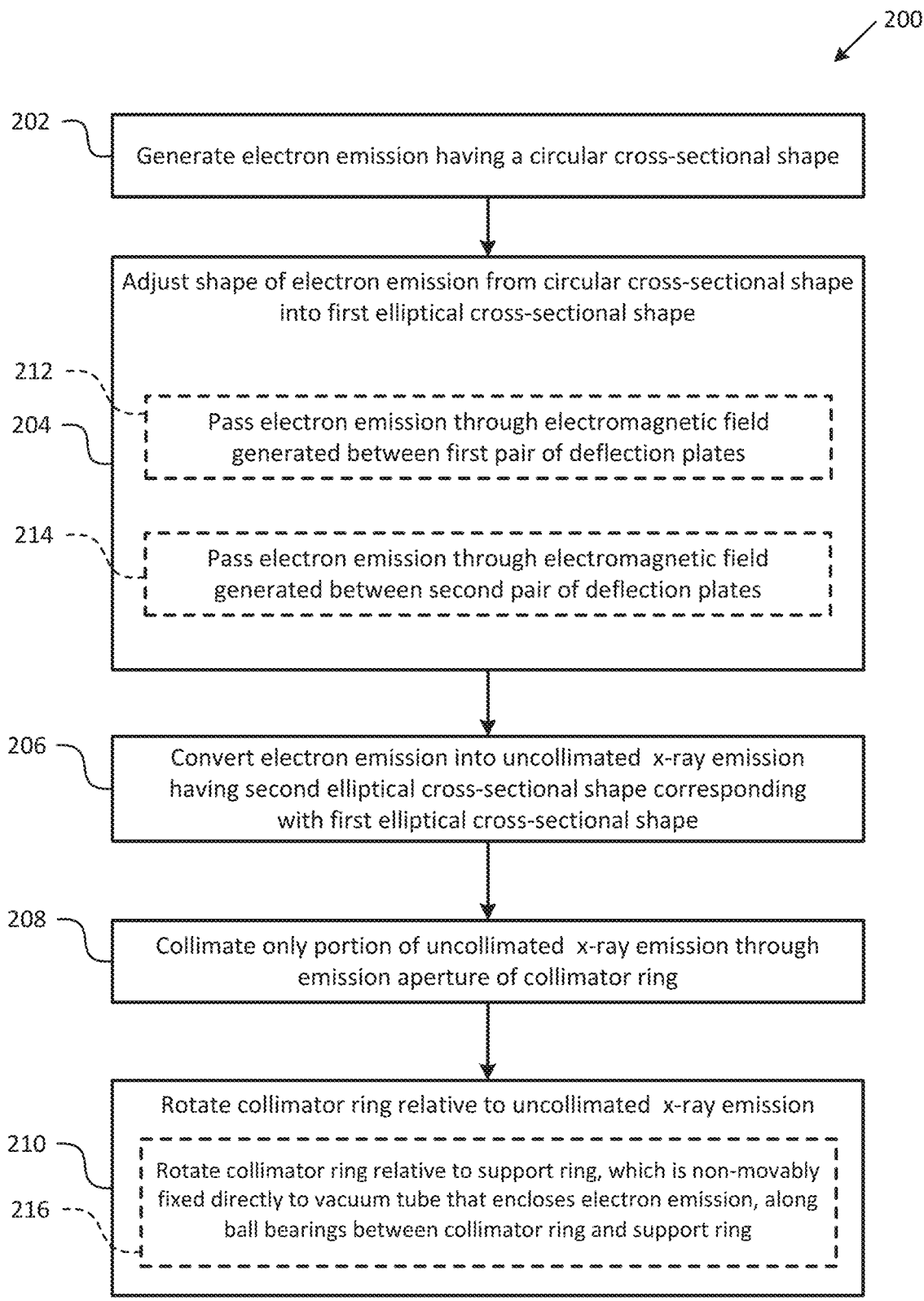
FIG. 15 is a schematic flow chart of a method of non-destructive inspection of a part, according to one or more examples of the present disclosure.

Referring to FIG. 15, and according to some examples, disclosed herein is a method 200 of non-destructive inspection of the part 102. The method 200 can be executed using the x-ray backscatter system 100 of the present disclosure. The method 200 includes (block 202) generating the electron emission 140 having the circular cross-sectional shape 169 and (block 204) adjusting the shape of the electron emission 140 from the circular cross-sectional shape 169 into the initial elliptical cross-sectional shape 170. In certain examples, the step of adjusting the shape of the electron emission 140 includes one or more of (block 212) passing the electron emission 140 through the electromagnetic field generated between the first pair of deflection plates 124 and (block 214) passing the electron emission 140 through the electromagnetic field generated between the second pair of deflection plates 126. The method 200 also includes (block 206) converting the electron emission 140 into the uncollimated x-ray emission 113 having the elliptical cross-sectional shape 174 corresponding with the initial elliptical cross-sectional shape 170. The method 200 additionally includes (block 208) collimating only a portion of the uncollimated x-ray emission 113 through the emission aperture 138 of the collimator ring 160 and (block 210) rotating the collimator ring 160 relative to the uncollimated x-ray emission 113. In some examples, the step of rotating the collimator ring 160 includes (block 216) rotating the collimator ring 160 relative to the support ring 162.

Figure 16:
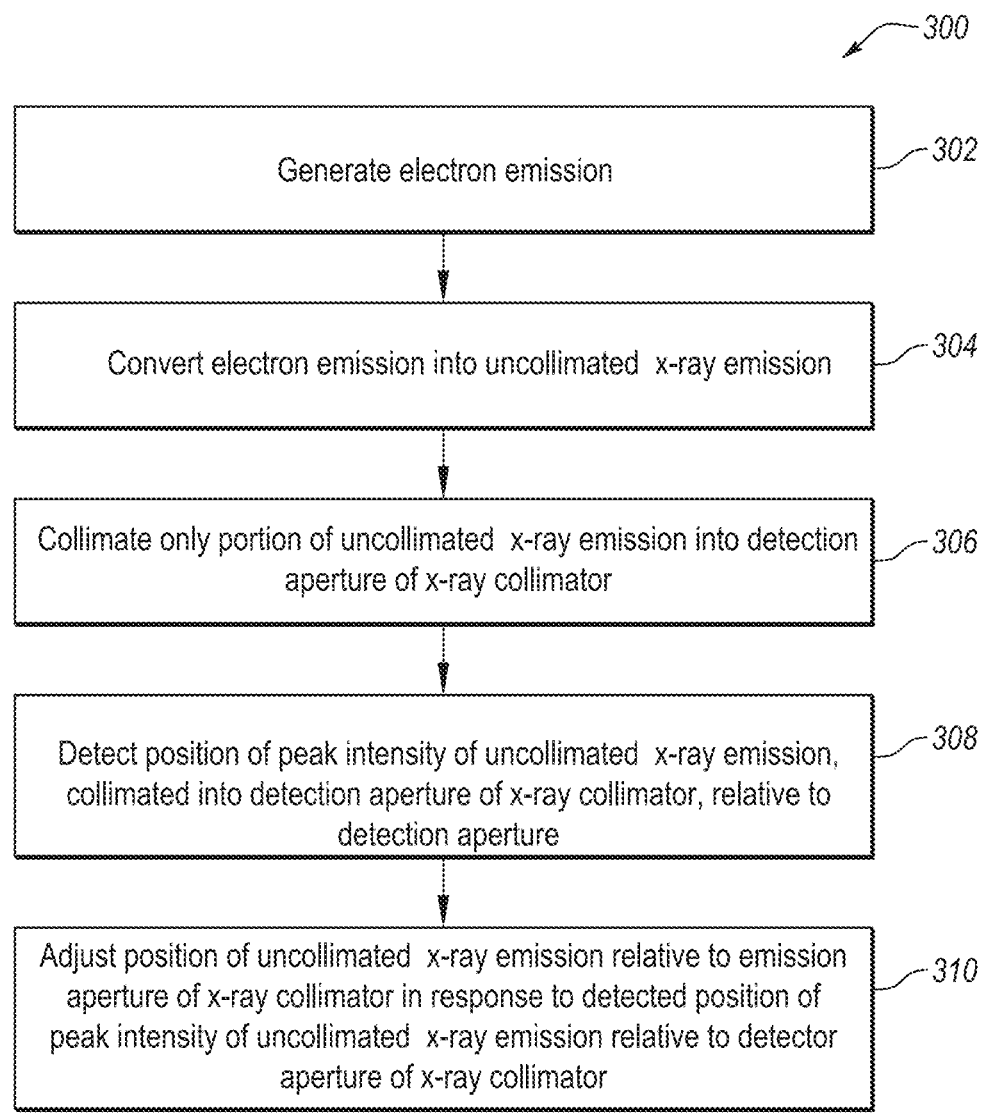
FIG. 16 is a schematic flow chart of a method of non-destructive inspection of a part, according to one or more examples of the present disclosure.

According to another example, as shown in FIG. 16, a method 300 of non-destructive inspection of a part 102, which can be practiced with the x-ray backscatter system 100 and the x-ray backscatter apparatus 101, includes (block 302) generating the electron emission 140 and (block 304) converting the electron emission 140 into the uncollimated x-ray emission 113. The method 300 also includes (block 306) collimating only a portion of the uncollimated x-ray emission 113 into the detection aperture 139 of the x-ray collimator 108. The method 300 additionally includes (block 308) detecting a position of the peak intensity of the uncollimated x-ray emission 113, collimated into the detection aperture 139, relative to the detection aperture 139. The method 300 further includes (block 310) adjusting the position of the uncollimated x-ray emission 113 relative to the emission aperture 138 of the x-ray collimator 108 in response to the detected position of the peak intensity of the uncollimated x-ray emission 113, collimated into the detection aperture 139, relative to the detection aperture 139.

Figure 17:
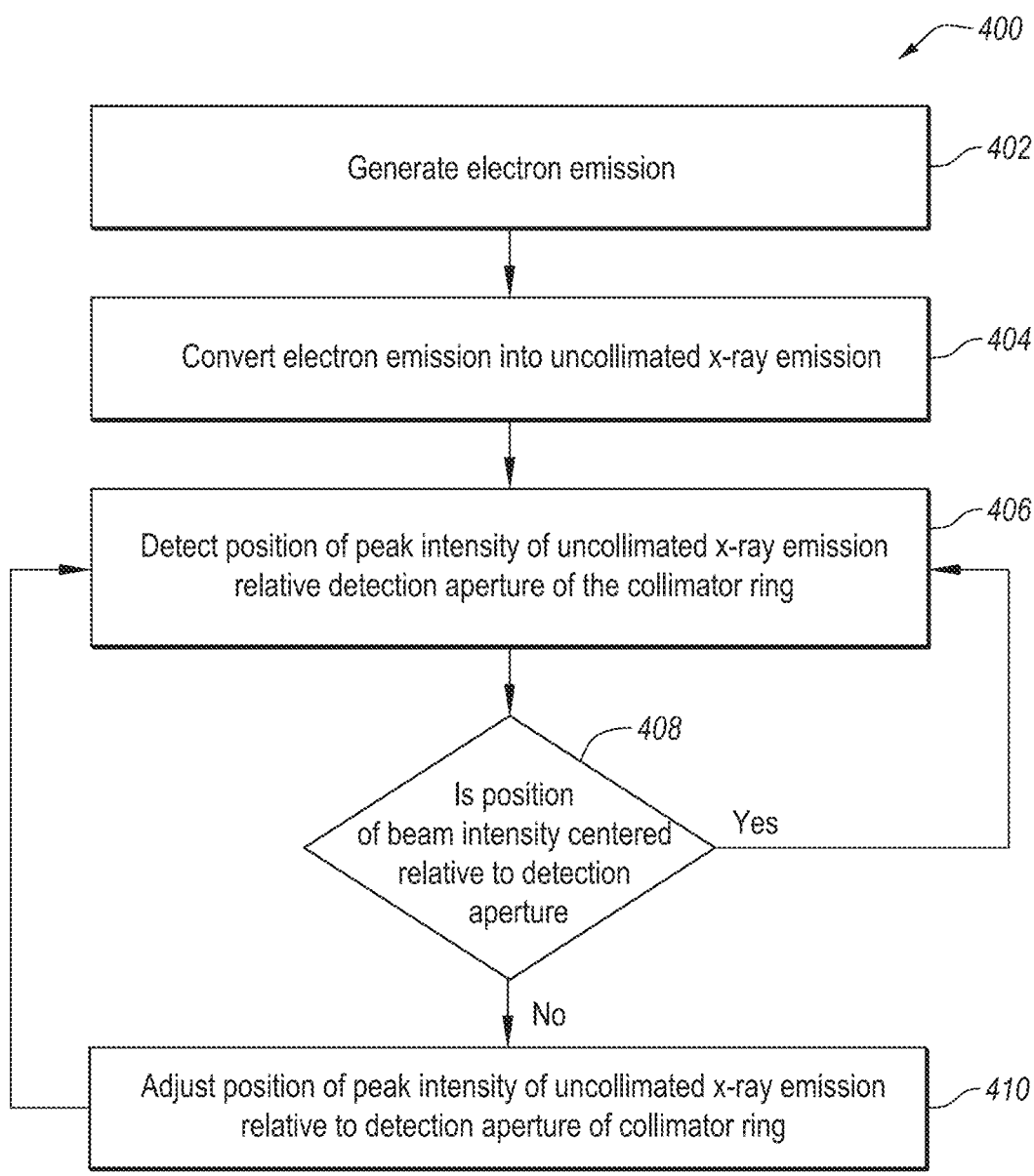
FIG. 17 is a schematic flow chart of a method of non-destructive inspection of a part, according to one or more examples of the present disclosure.

In some examples, as shown in FIG. 17, a method 400, similar to the method 300, includes (block 402) generating the electron emission 140 and (block 404) converting the electron emission 140 into the uncollimated x-ray emission 113. The method 400 also includes (block 406) detecting a position of the peak intensity of the uncollimated x-ray emission 113 relative to the detection aperture 139. The method 400 further includes (block 408) determining whether the detected position of the peak intensity of the uncollimated x-ray emission 113, collimated into the detection aperture 139, is centered relative to the detection aperture 139. If the detected position of the peak intensity of the uncollimated x-ray emission 113 is determined to be centered at (block 408), such as based on x-ray intensity data from the x-ray intensity sensor 188, then the method 400 either stops (and restarts after a predetermined period of time) or, as shown, loops back and repeats (block 406). However, If the detected position of the peak intensity of the uncollimated x-ray emission 113 is determined to not be centered at (block 408), such as based on x-ray intensity data from the x-ray intensity sensor 188, then the method 400 proceeds to (block 410) adjust the position of the peak intensity of the uncollimated x-ray emission 113 relative to the detection aperture 139, and thus the emission apertures 138. After adjusting the position of the peak intensity of the uncollimated x-ray emission 113 at (block 410), the method 400 loops back and repeats (block 406) and (block 408) to determine if the adjustment at (block 410) was sufficient to center the peak intensity of the uncollimated x-ray emission 113. Accordingly, in some examples, a closed loop of detection and adjustment is performed until the detected position of the peak intensity of the uncollimated x-ray emission 113, collimated into the detection aperture 139, is centered relative to the detection aperture 139. This closed loop, including the determination step at (block 408), can be incorporated into the method 300.

According to some examples, the step of adjusting the position of the uncollimated x-ray emission 113 at (block 310) or the step of adjusting the position of the peak intensity of the uncollimated x-ray emission 113 at (block 410) includes moving the emission aperture 138 in a second direction, perpendicular to a first direction, wherein the first direction is the direction the emission aperture 138 is moved, relative to the uncollimated x-ray emission 113, such that only a portion of the uncollimated x-ray emission 113 passes through the emission aperture 138. In yet some examples, the step of adjusting the position of the uncollimated x-ray emission 113 at (block 310) or the step of adjusting the position of the peak intensity of the uncollimated x-ray emission 113 at (block 410) includes at least one of, or both of in certain examples: moving the x-ray collimator 108 relative to the anode 130 in the second direction; or moving the electron emission 140 relative to the anode 130.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An x-ray backscatter apparatus for non-destructive inspection of a part, the x-ray backscatter apparatus comprising:
    an x-ray source, comprising:
        a cathode that is selectively operable to generate an electron emission; and an anode, configured to receive the electron emission from the cathode and to convert the electron emission into an uncollimated x-ray emission;

an x-ray collimator, comprising a plurality of emission apertures and a detection aperture;

an x-ray intensity sensor, fixed to the x-ray collimator over the detection aperture such that at least a portion of the uncollimated x-ray emission, collimated into the detection aperture, is detected by the x-ray intensity sensor; and an emission alignment adjuster, operable to adjust a position of the uncollimated x-ray emission relative to the plurality of emission apertures and the detection aperture in response to the at least the portion of the uncollimated x-ray emission detected by the x-ray intensity sensor.

2. The x-ray backscatter apparatus according to claim 1, wherein:

the x-ray intensity sensor comprises a plurality of pixels, each configured to detect an intensity of the uncollimated x-ray emission independent of any other one of the plurality of pixels; and the plurality of pixels are arranged linearly in a side-by-side manner.

3. The x-ray backscatter apparatus according to claim 2, wherein:

the x-ray collimator comprises a collimator ring;

the plurality of emission apertures and the detection aperture are formed in the collimator ring;

the collimator ring is rotatable about the anode such that the plurality of emission apertures and the detection aperture move relative to the uncollimated x-ray emission in a rotational direction; and the plurality of pixels of the x-ray intensity sensor are arranged linearly in a linear direction that is perpendicular to the rotational direction.

4. The x-ray backscatter apparatus according to claim 3, wherein:

the plurality of pixels comprises a central pixel and a plurality of side pixels on opposite sides of the central pixel; and a plane, parallel with the rotational direction and bisecting the plurality of emission apertures and the detection aperture, bisects the central pixel.

5. The x-ray backscatter apparatus according to claim 4, wherein the emission alignment adjuster adjusts the position of the uncollimated x-ray emission relative to the plurality of emission apertures and the detection aperture when the central pixel of the x-ray intensity sensor does not detect a peak intensity of the at least the portion of the uncollimated x-ray emission collimated into the detection aperture.

6. The x-ray backscatter apparatus according to claim 3, wherein the x-ray intensity sensor is fixed to the collimator ring such that the x-ray intensity sensor rotates about the anode as the collimator ring rotates about the anode.

7. The x-ray backscatter apparatus according to claim 3, wherein:

each one of the plurality of emission apertures is spaced apart, along a circumference of the collimator ring, from an adjacent one of the plurality of emission apertures by a first distance;

the detection aperture is interposed between an adjacent two emission apertures of the plurality of emission apertures such that the detection aperture is spaced apart, along the circumference of the collimator ring, from either one of the adjacent two emission apertures of the plurality of emission apertures by a second distance; and the second distance is less than the first distance.

8. The x-ray backscatter apparatus according to claim 1, wherein the emission alignment adjuster comprises an alignment-adjustment coil, between the cathode and the anode and fixed relative to the cathode and the anode such that the alignment-adjustment coil does not move relative to the cathode and the anode.

9. The x-ray backscatter apparatus according to claim 8, wherein the alignment-adjustment coil is configured to generate an adjustable electromagnetic field that is adjustable to move the electron emission, linearly along the anode in an anode direction such that the uncollimated x-ray emission moves linearly along the x-ray collimator in a linear direction.

10. The x-ray backscatter apparatus according to claim 1, wherein the emission alignment adjuster comprises a linear actuator, coupled to the x-ray collimator and operable to translationally move the x-ray collimator, including the plurality of emission apertures and the detection aperture, relative to the anode.

11. The x-ray backscatter apparatus according to claim 10, wherein:

the x-ray collimator comprises a collimator ring;

the plurality of emission apertures and the detection aperture are formed in the collimator ring;

the collimator ring is rotatable about the anode such that the plurality of emission apertures and the detection aperture move relative to the uncollimated x-ray emission in a rotational direction; and the linear actuator moves the collimator ring in a linear direction that is perpendicular to the rotational direction.

12. The x-ray backscatter apparatus according to claim 1, wherein:

the emission alignment adjuster comprises:

an alignment-adjustment coil, between the cathode and the anode and fixed relative to the cathode and the anode such that the alignment-adjustment coil does not move relative to the cathode and the anode; and a linear actuator, coupled to the x-ray collimator and operable to translationally move the x-ray collimator, including the plurality of emission apertures and the detection aperture, relative to the anode;

the alignment-adjustment coil is configured to adjust the position of the uncollimated x-ray emission, relative to the plurality of emission apertures and the detection aperture, up to a first predetermined distance;

the linear actuator is configured to adjust the position of the uncollimated x-ray emission, relative to the plurality of emission apertures and the detection aperture, up to a second predetermined distance; and the second predetermined distance is greater than the first predetermined distance.

13. The x-ray backscatter apparatus according to claim 1, wherein the x-ray intensity sensor is a radiation hardened sensor such that the x-ray intensity sensor prevents the uncollimated x-ray emission from exiting the detection aperture of the x-ray collimator.

14. The x-ray backscatter apparatus according to claim 1, wherein the x-ray source further comprises:

a first pair of deflection plates between the cathode and the emission alignment adjuster;

a second pair of deflection plates between the first pair of deflection plates and the alignment adjuster;

a first alignment coil between the cathode and the first pair of deflection plates; and a second alignment coil between the second pair of deflection plates and the emission alignment adjuster.

15. An x-ray backscatter system for non-destructive inspection of a part, the x-ray backscatter system comprising:

an x-ray backscatter apparatus, comprising:
an x-ray source, comprising:
a cathode that is selectively operable to generate an electron emission; and
an anode, configured to receive the electron emission from the cathode and to convert the electron emission into an uncollimated x-ray emission;
an x-ray collimator, comprising a plurality of emission apertures and a detection aperture and configured to convert the uncollimated x-ray emission into a collimated x-ray emission, comprising a portion of the uncollimated x-ray emission collimated through the plurality of emission apertures;
an x-ray intensity sensor, fixed to the x-ray collimator over the detection aperture such that at least a portion of the uncollimated x-ray emission collimated into the detection aperture is detected by the x-ray intensity sensor;
an emission alignment adjuster, operable to adjust a position of the uncollimated x-ray emission relative to the plurality of emission apertures and the detection aperture; and
a plurality of x-ray detectors, positioned to detect backscattered portions of the collimated x-ray emission, backscattered off of the part; and
a controller, operably coupled with the x-ray intensity sensor and the emission alignment adjuster and configured to control the emission alignment adjuster, such that a position of the uncollimated x-ray emission, relative to the plurality of emission apertures and the detection aperture, is adjusted in response to the at least the portion of the uncollimated x-ray emission detected by the x-ray intensity sensor.

16. A method of non-destructive inspection of a part, the method comprising steps of:
generating an electron emission;
converting the electron emission into an uncollimated x-ray emission;
collimating only a portion of the uncollimated x-ray emission into a detection aperture of an x-ray collimator;

detecting at least a portion of the uncollimated x-ray emission, collimated into the detection aperture, via a sensor fixed to the x-ray collimator over the detection aperture; and
adjusting a position of the uncollimated x-ray emission relative to a plurality of emission apertures of the x-ray collimator in response to the at least the portion of the uncollimated x-ray emission detected by the sensor.

17. The method according to claim 16, further comprising a step of determining whether a detected position of a peak intensity of the uncollimated x-ray emission, collimated into the detection aperture, is centered relative to the detection aperture, wherein the step of adjusting the position of the uncollimated x-ray emission relative to the emission aperture of the x-ray collimator comprises adjusting the position of the uncollimated x-ray emission relative to the emission aperture when the detected position of the peak intensity of the uncollimated x-ray emission, collimated into the detection aperture, is not centered relative to the detection aperture.

18. The method according to claim 17, wherein the step of adjusting the position of the uncollimated x-ray emission relative to the emission aperture of the x-ray collimator comprises adjusting the position of the uncollimated x-ray emission relative to the emission aperture until the detected position of the peak intensity of the uncollimated x-ray emission, collimated into the detection aperture, is centered relative to the detection aperture.

19. The method according to claim 16, further comprising moving the emission aperture in a first direction, relative to the uncollimated x-ray emission, such that only a portion of the uncollimated x-ray emission passes through the emission aperture, wherein the step of adjusting the position of the uncollimated x-ray emission relative to the emission aperture of the x-ray collimator comprises moving the emission aperture in a second direction that is perpendicular to the first direction.

20. The method according to claim 16, wherein:
the step of converting the electron emission into the uncollimated x-ray emission comprises impacting an anode with the electron emission; and
the step of adjusting the position of the uncollimated x-ray emission relative to the emission aperture of the x-ray collimator comprises at least one of:
moving the x-ray collimator relative to the anode in the second direction; or
moving the electron emission relative to the anode.

* * * * *